(12) United States Patent
Makimura et al.

(10) Patent No.: US 8,207,688 B2
(45) Date of Patent: Jun. 26, 2012

(54) ELECTRIC-DISCHARGE LAMP LIGHTING DEVICE AND LIGHTING FIXTURE

(75) Inventors: Shinji Makimura, Kitakatsuragi (JP); Hiroshi Kido, Hirakata (JP)

(73) Assignee: Panasonic Corporation, Osaka (JP)

( * ) Notice: Subject to any disclaimer, the term of this patent is extended or adjusted under 35 U.S.C. 154(b) by 242 days.

(21) Appl. No.: 12/668,515

(22) PCT Filed: Sep. 5, 2007

(86) PCT No.: PCT/JP2007/067306
§ 371 (c)(1),
(2), (4) Date: Jan. 11, 2010

(87) PCT Pub. No.: WO2009/013840
PCT Pub. Date: Jan. 29, 2009

(65) Prior Publication Data
US 2010/0231134 A1    Sep. 16, 2010

(30) Foreign Application Priority Data
Jul. 26, 2007 (JP) .................................. 2007-193983

(51) Int. Cl.
*H05B 37/02* (2006.01)
(52) U.S. Cl. .......................... 315/307; 315/224; 315/308
(58) Field of Classification Search .............. 315/209 R, 315/224–226, 246–247, 291, 297, 307–308
See application file for complete search history.

(56) References Cited

U.S. PATENT DOCUMENTS

| | | | |
|---|---|---|---|
| 6,160,362 A * | 12/2000 | Shone et al. ................... | 315/308 |
| 6,943,502 B2 * | 9/2005 | Yamanaka et al. ............. | 315/224 |
| 6,977,472 B2 * | 12/2005 | Matsubayashi et al. ....... | 315/291 |
| 6,998,792 B2 * | 2/2006 | Takahashi et al. ............. | 315/248 |
| 7,365,498 B2 * | 4/2008 | Makimura et al. ............. | 315/219 |
| 2007/0228992 A1 * | 10/2007 | Matsumoto ................ | 315/209 R |
| 2007/0296355 A1 * | 12/2007 | Hamamoto et al. .......... | 315/309 |
| 2008/0278088 A1 * | 11/2008 | Yu et al. ......................... | 315/225 |
| 2009/0236999 A1 | 9/2009 | Yufuku et al. | |
| 2009/0323033 A1 | 12/2009 | Konishi et al. | |
| 2010/0013393 A1 | 1/2010 | Onishi et al. | |
| 2010/0033692 A1 | 2/2010 | Watanabe et al. | |
| 2010/0039581 A1 | 2/2010 | Mishima et al. | |

FOREIGN PATENT DOCUMENTS

| | | |
|---|---|---|
| JP | 05-219730 | 8/1993 |
| JP | 2001-515650 | 9/2001 |
| JP | 2005-063862 | 3/2005 |
| JP | 2006-114355 | 4/2006 |

* cited by examiner

*Primary Examiner* — Tung X Le
(74) *Attorney, Agent, or Firm* — Greenblum & Bernstein, P.L.C.

(57) ABSTRACT

An electric-discharge lamp lightning device includes a first frequency controller for sweeping a switching frequency so that the output of an inverter is gradually increased in order to allow an electric-discharge lamp to be started and lighted, and a second frequency controller for detecting the output power of the inverter by a current flowing in a resonant circuit and controlling the switching frequency so that the output power is set to be a target value after the discharge lamp is started and lighted. The first frequency controller includes a holding means for holding the switching frequency just after the lighting detection when the output power is smaller than the target value at the lighting detection of the electric-discharge lamp by a lighting detection circuit.

11 Claims, 24 Drawing Sheets

ELECTRIC-DISCHARGE LAMP LIGHTING DEVICE AND LIGHTING FIXTURE

TECHNICAL FIELD

The present invention relates to an electric-discharge lamp lighting device and a lighting fixture using the electric-discharge lamp lighting device.

BACKGROUND ART

FIG. 1 is a diagram showing a configuration of a conventional electric-discharge lamp lighting device. This electric-discharge lamp lighting device includes a dc power supply 1 for outputting a dc voltage VDC by receiving a electric power from an ac power supply Vin, an inverter 2 for outputting a high-frequency voltage Vcoil by receiving a electric power from the dc power supply 1, a voltage controller 13 for controlling variability of the output voltage Vcoil from the inverter 2 by controlling a switching frequency of the inverter 2, a load 3 including an induction coil 5 connected to an output of the inverter 2 and an electrodeless discharge lamp 6 provided adjacent to the induction coil 5, and a current controller 17 for controlling the switching frequency so as to maintain an output power of the electrodeless discharge lamp 6 at an approximately constant target value.

The dc power supply 1 includes a rectifier diode bridge DB and a boost chopper circuit including a switching element Q6, an inductor L10, a diode D10, a controller 10, and a smoothing capacitor C10. The inverter 2 includes switching elements Q3 and Q4, and an inductor Ls and capacitors Cp and Cs that are elements of a resonant circuit. The electrodeless discharge lamp 6 includes a clear spherical glass bulb or a spherical glass bulb of which an inner surface is coated with phosphor, filled with discharge gas such as inactive gases and metal vapor (for instance, mercury and rare gases). The induction coil 5 is provided adjacent to the electrodeless discharge lamp 6. The inverter 2 applies a high-frequency current of several tens of kHz to several MHz to the induction coil 5, whereby a high-frequency electromagnetic field is produced by the induction coil 5 and a high-frequency power is supplied to the electrodeless discharge lamp 6. According to this, a high-frequency plasma current is produced in the electrodeless discharge lamp 6 so as to produce ultraviolet or visible light.

As shown in FIG. 2, a drive circuit 11 includes a constant voltage source Es, a voltage control oscillator VCO, and resistors R10 and R11. An input terminal VI of the voltage control oscillator VCO is supplied with an output voltage of the constant voltage source Es divided by the resistors R10 and R11, whereby an oscillation frequency is altered according to a sink current Io from the respective dividing points. The input terminal VI of the voltage control oscillator VCO is supplied with a voltage depending on the sink current Io, and the voltage control oscillator VCO outputs an approximate square wave drive signal, at a switching frequency finv corresponding to the voltage depending on the sink current Io, with respect to each switching element Q3 and Q4 mutually shifted in phase by approximately 180° between an Hout terminal and an H-GND terminal and between an Lout terminal and an L-GND terminal.

The voltage controller 13 includes an integrator including an operational amplifier Q1, a resistor R1, and a capacitor C1, a switch SW0 for discharging a charge of the capacitor C1, and the like.

The current controller 17 includes an integrator including an operational amplifier Q9, a resistor R10, and a capacitor C11, resistors R5 and R6 for producing a reference voltage, and the like. The current controller 17 differentially amplifies a signal from a resistor Rd for detecting a resonance current of the inverter 2.

The drive circuit 11 varies the switching frequency according to a sum (=Io) of sink currents Isw, Ifb and Ivr flowing into the voltage controller 13, the current controller 17 and a variable resistor VR from the input terminal VI.

Variable resistor VR is performed to absorb deviations in circuit components, such as the resonant circuit of the inverter 2 and load 3, and the drive circuit 11. When a frequency sweep control (described later) is performed by the voltage controller 13, the variable resistor VR is adjusted for setting an appropriate frequency variation range thereby performing a stable starting and lighting. The following are descriptions of operations with reference to FIGS. 4 and 7. Note that, in FIGS. 4 and 7, a reference sign "a" (solid line) represents a case with a variation of a load impedance, and a reference sign "b" (dashed line) represents a case with no variation of the load impedance. When the switch SW0 is switched from an ON-state to an OFF-state, the voltage controller 13 charges the capacitor C1 by supplying a electric power from a dc voltage E1 via the resistor R1, applies a voltage VC1 at both ends of the capacitor C1 to a non-inverting input terminal of the operational amplifier Q1, and varies the voltage VI according to the voltage VC1 at both ends of the capacitor C1, so as to perform the frequency sweep control (start frequency fs→end frequency fe) of the drive circuit 11.

When it is assumed here that the relationship between the input voltage VI and switching frequency finv of the drive circuit 11 is set to have an inclination shown in FIG. 3, the voltage VI is increased since the sink current Io (=Isw) is decreased when the voltage VC1 is increased. As a result, the switching frequency finv is gradually decreased. Therefore, the voltage Vcoil is gradually increased when the switching frequency finv and the voltage Vcoil have a relationship shown in FIG. 7. In addition, since the electrodeless discharge lamp 6 is configured to exceed a voltage minimally necessary to start ignition during the frequency sweep, the electrodeless discharge lamp 6 is lighted at a certain switching frequency finv (=fi), and the voltage Vcoil is decreased immediately, thereby shifting to the lighting side on the curve line in the figure.

Note that, during the frequency sweep control, the resonance current of the inverter 2 is increased from an initial state (≅zero). Thus, an output of the operational amplifier Q9 is decreased from the high voltage at the initial state. However, the operational amplifier Q9 produces a delay time to an operation of a differential amplifier due to the function of the resistor R10 and the capacitor C11 of the integrator. Therefore, while the output Vout of the operational amplifier Q9 is high compared with the voltage VI of the input terminal of the drive circuit 11, the sink current Ifb from the drive circuit 11 becomes approximately zero and a mask operation is performed, thereby resulting in the current Io≅Isw+Ivr. Accordingly, the switching frequency of the drive circuit 11 is controlled by the output of the voltage controller 13.

Then, after the electrodeless discharge lamp 6 is lighted at the time t=t2, the switching frequency keeps varying until the voltage VC1 becomes a constant value. In this case, after the electrodeless discharge lamp 6 is lighted when the switching frequency is "fi" in FIG. 7, the switching frequency keeps varying until the end point of the frequency, "fe". However, the operational amplifier Q9 performs a negative feedback operation thereby the current Ifb flows out at the time t>t3 due to the decrease of the output Vout of the operational amplifier Q9. Then the switching frequency finv is increased, and the frequency is controlled until resulting in a predetermined resonance current of the inverter 2 arranged according to a reference voltage determined by the resistors R5 and R6, thereby resulting in a certain frequency fx. Due to such a feedback control, it is possible to maintain the output power of the inverter 2 at an approximately constant predetermined value.

In addition, as shown in FIG. 12, the load 3 may be other electric-discharge lamps such as a construction including an electric-discharge lamp (fluorescent light) FL having filaments F1 and F2 and a capacitor C20, and the like. Such electric-discharge lamps perform the similar operations.

In particular, the load of the electrodeless discharge lamp is an inductor load when starting ignition. Thus, a larger voltage and power is required when starting compared with other light sources such as a fluorescent light with electrodes. Accordingly, it is necessary to set a Q factor of the resonant circuit of the inverter 2 to be high in order to start and light stably. However, when there are some factors for a load impedance variation of the inverter 2 such as a change in ambient temperature and an approach of a metal housing toward a circumference of the electrodeless discharge lamp 6, the voltage Vcoil is greatly altered, which results in difficulty in starting and lighting stably. Therefore, by starting by the frequency sweep, it is possible to start and light stably since an influence of the load impedance variation can be absorbed to some extent. Consequently, starting by the frequency sweep can be effective especially when the electrodeless discharge lamp is employed.

Japanese Patent Laid-Open Publication No. 2005-063862 discloses a start-up of a load of an electrodeless discharge lamp using frequency sweep, and discloses a configuration to improve start-up performance by applying a sufficient voltage even if constants of components are altered by sweeping from a higher frequency than an actual resonance frequency toward the resonance frequency.

However, when the inverter 2 and the load 3 include the resonant circuit, and when the electric-discharge lamp is started and lighted being supplied with power by the switching frequency control by use of the resonance property, a resonance output of the resonant circuit included in the inverter 2 and the load 3 varies as an impedances of the inverter 2 and the load 3 vary. Thus, there was a problem that a stable starting and lighting could not be achieved because of an insufficient power supply to the electric-discharge lamp, an occurrence of dying out, and the like. As for factors for such impedance variation, a change in ambient temperature, a variability and time-dependent change of constants of circuit components, an approach of a metal housing toward the load 3, and the like are included.

Specifically, when the electrodeless discharge lamp 6 is uses as the load 3, the impedance variation is significantly occurred because of the approach of the metal housing. FIG. 6 shows an example of a downlight using the electrodeless discharge lamp 6. The electrodeless discharge lamp 6 in the downlight is covered with a reflecting plate 30. When the reflecting plate 30 has high conductivity especially being made of metal, an induced current 31 by electromagnetic induction from the induction coil 5 circularly flows on the reflecting plate 30. Thus, an inductive component by the reflecting plate 30 is produced, which results in a parallel connection of the inductor to the induction coil 5 in an equivalent circuit. Consequently, the resonance curve lines when starting and lighting as shown in FIG. 7 are shifted to the high frequency side compared with a case not including the metal housing such as a downlight.

In the case with the variation of the load impedance in FIG. 7 (shown as the solid line, the reference sign "a"), the frequency varies until the capacitor C1 is fully charged and the voltage VC1 becomes the constant value even after the electrodeless discharge lamp 6 is lighted. Therefore, the frequency varies until the end point frequency fe. However, since the resonance curve line is shifted to the high frequency side, the frequency sweep is performed until over a peak of the resonance curve line when lighting and further until an area where the output voltage Vcoil is decreased. Thus, the end point frequency fe results in a lower frequency than the peak of the resonance curve line when lighting. In such an area, the switching frequency control by a negative feedback operation using the operational amplifier Q9 of the current controller 17 is to be unable to function because of an increase and decrease relationship between the switching frequency and the output power (or the resonance current of the inverter 2). As a result, there were problems such as that the output power could not become a predetermined value, and the electrodeless discharge lamp 6 was dying out.

As a method to avoid such a matter, it may be applicable that the end point frequency fe is adjusted while the electrodeless discharge lamp 6 is fixed to an apparatus surrounded by the metal housing. However, it is necessary to perform such adjustment for each case in order to adapt to a variety of apparatuses. This is not substantive because of much time and high cost.

The present invention has been made to solve the above-mentioned problem. It is an object of the present invention to provide an electric-discharge lamp lighting device and a lighting fixture thereof capable of starting and lighting stably even when a load impedance of the discharge lamp varies.

SUMMARY OF THE INVENTION

In order to solve the above-described problems, an electric-discharge lamp lighting device according to an aspect of the present invention, as shown in FIG. 8, includes: a power inverter (inverter 2) for outputting an ac voltage Vcoil by receiving a electric power from a dc power supply 1 and includes at least switching elements Q3 and Q4 and a resonant circuit (Ls, Cp, Cs); a drive circuit 11 for driving the switching elements Q3 and Q4; a load 3 connected to an output of the power inverter and connected to at least an electric-discharge lamp 6; a first frequency controller 13 for sweeping an switching frequency finv of the drive circuit 11 so that the output of the power inverter is gradually increased in order to allow the electric-discharge lamp 6 to be started and lighted; a second frequency controller 17 for detecting an output power of the power inverter by a current flowing in the resonant circuit and controlling the switching frequency of the drive circuit 11 so that the output power is set to be a target value after the discharge lamp 6 is started and lighted; and a lighting detection circuit 14 performing a lighting detection of the electric-discharge lamp 6 by detecting the output of the power inverter, wherein the first frequency controller 13 includes a holding means 16 for holding an switching frequency just after the lighting detection when the output power is smaller than the target value at the lighting detection by the lighting detection circuit 14.

DESCRIPTION OF EMBODIMENTS (Embodiment 1)

Figure 1:
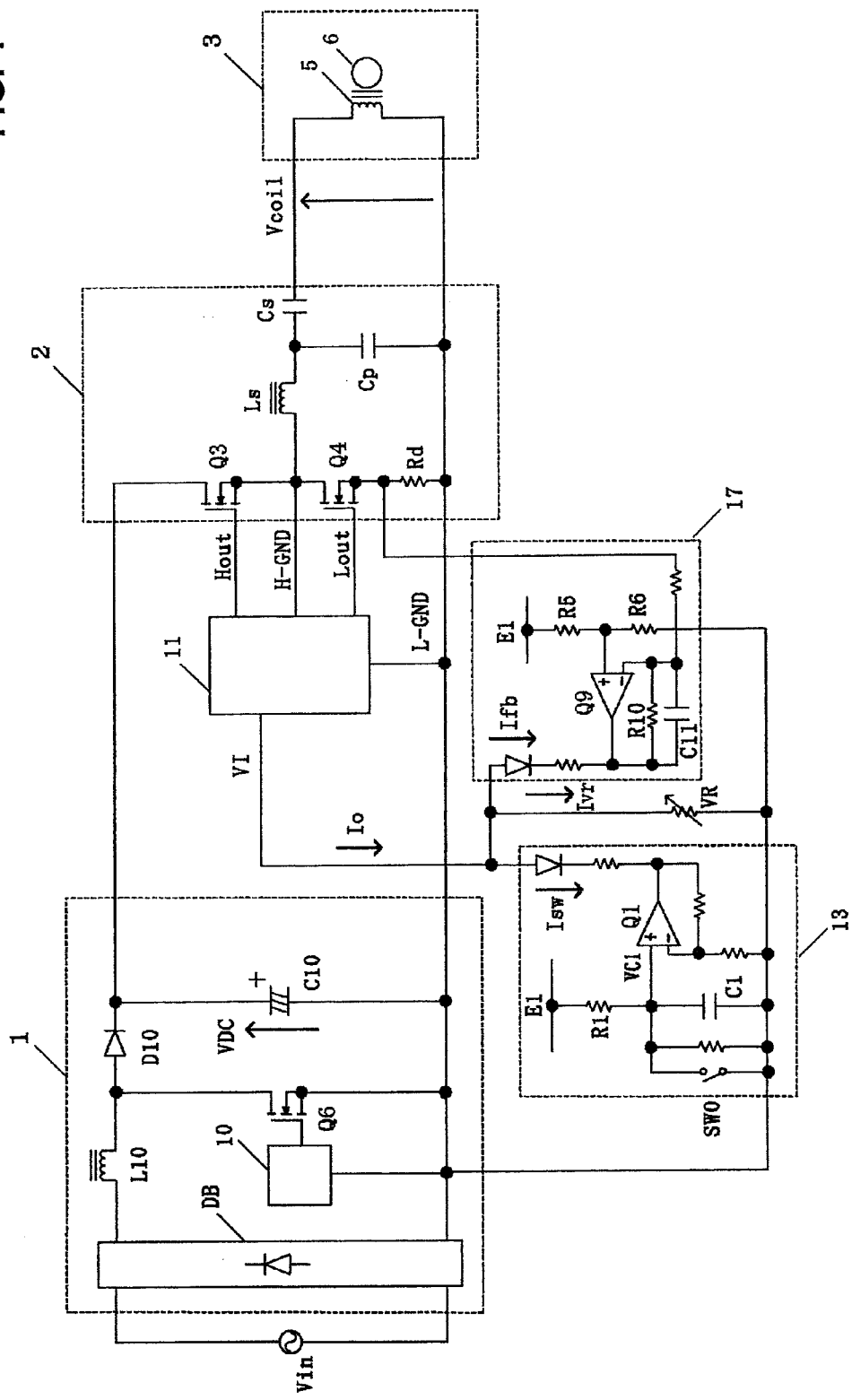
FIG. 1 is a circuit diagram showing a constitution of a conventional example.
Figure 2:
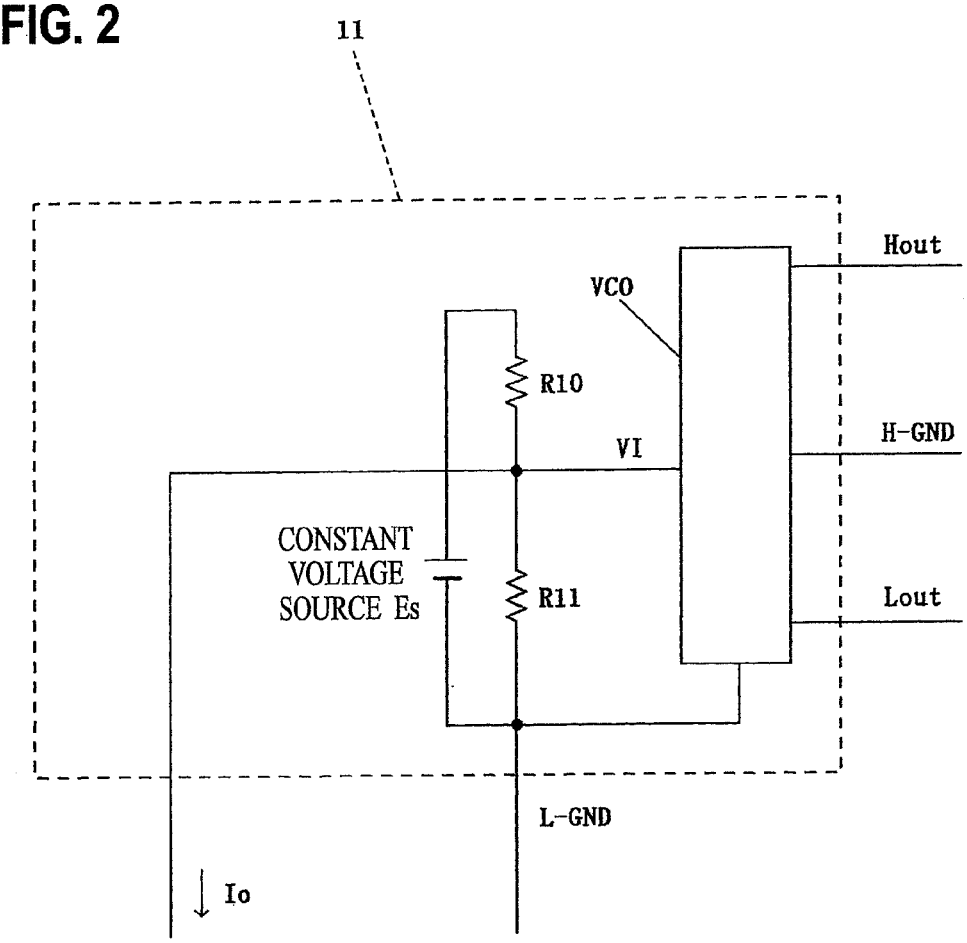
FIG. 2 is a circuit diagram showing a constitution of a main part of a conventional example.
Figure 3:
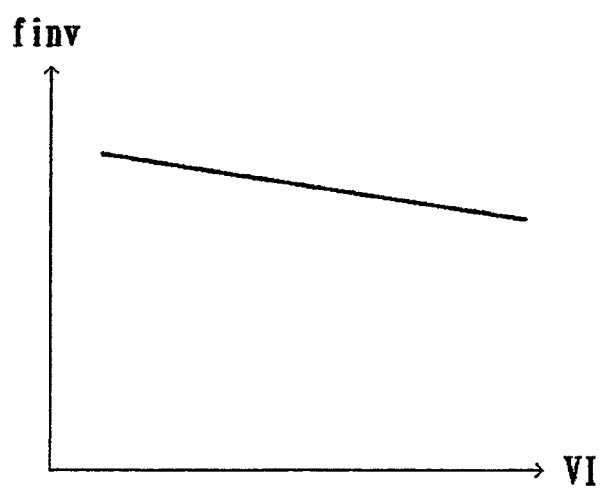
FIG. 3 is a chart showing characteristics of an oscillation frequency of a conventional example.
Figure 8:
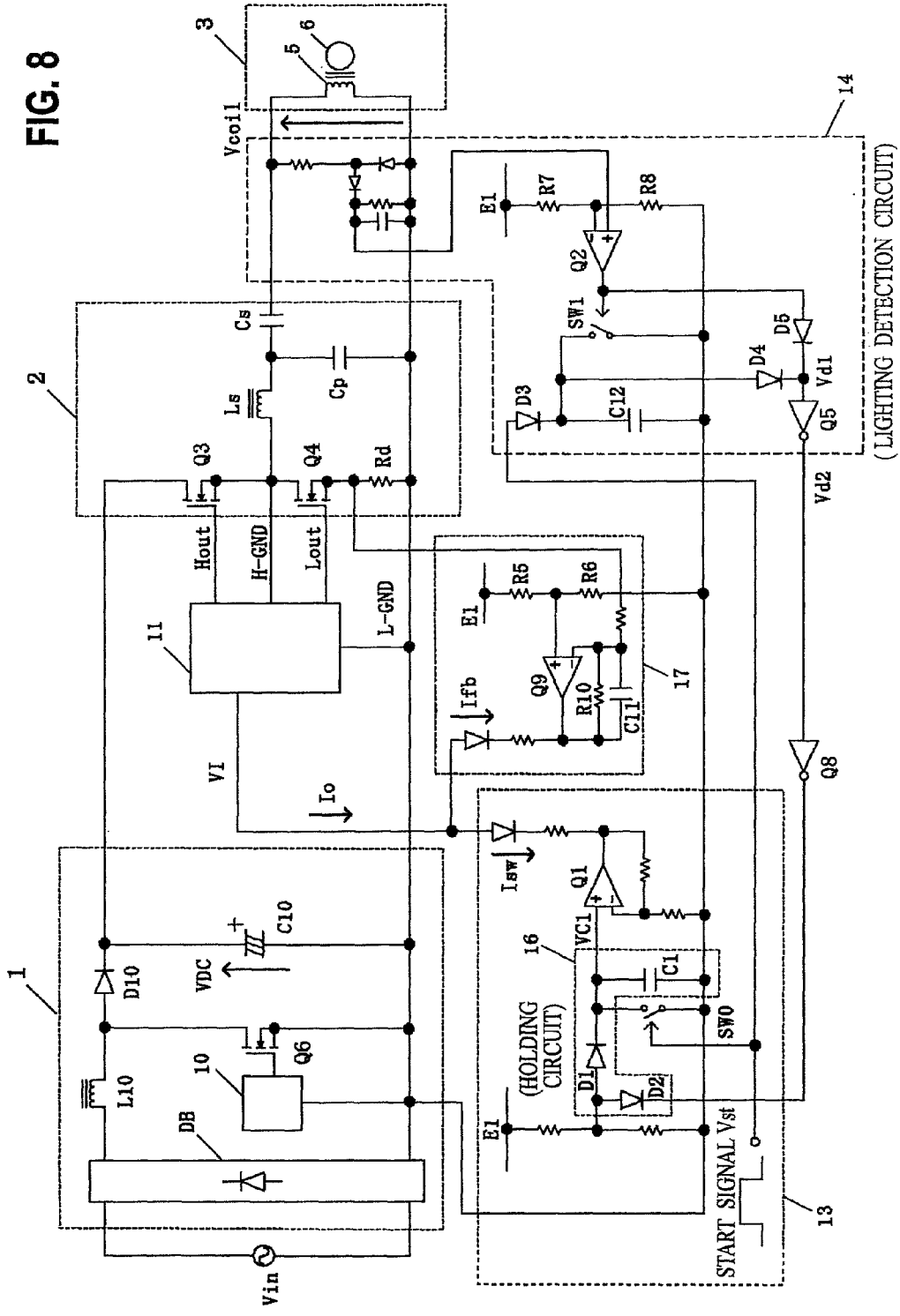
FIG. 8 is a circuit diagram showing a constitution in an embodiment 1 of the present invention.

FIG. 8 shows a constitution of an embodiment 1. Explanations of constitutions, operations and effects similar to the conventional example are omitted. Differences from the conventional example (FIG. 1) are what the embodiment 1 includes a lighting detection circuit 14 for detecting a lighting of the electrodeless discharge lamp 6, and a holding circuit 16 for immediately stopping a frequency sweep control and holding a switching frequency finv when the lighting of the electrodeless discharge lamp 6 is detected by performing the frequency sweep control in the voltage controller 13, and does not include the variable resistor VR. In addition, the ON/OFF state of the switch SW0 is switched by a start signal Vst that is a trigger signal for starting the frequency sweep. Moreover, the start signal Vst is also applied to the lighting detector 14.

The lighting detection circuit 14 includes a circuit for dividing, rectifying and smoothing the high-frequency voltage Vcoil, a capacitor C12 for holding the start signal Vst for a predetermined period to apply a trigger for the frequency sweep control, an operational amplifier Q2 for detecting a case that the high-frequency voltage Vcoil exceeds a predetermined value during the frequency sweep control, a switch SW1 for allowing the capacitor C12 to be discharged by receiving an output of the operational amplifier Q2, diodes D4 and D5 composing an OR gate, a logical inverter Q5 for inverting an input signal, and the like. Also, the holding circuit 16 includes the capacitor C1 and diodes D1 and D2.

Figure 9:
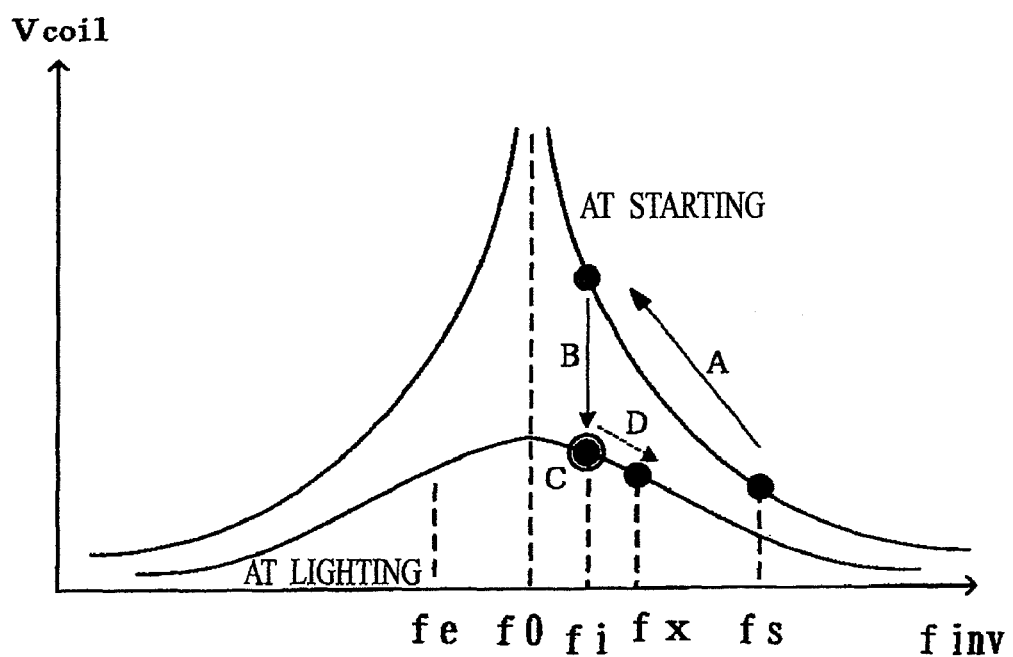
FIG. 9 is a chart showing resonance characteristics in the embodiment 1 of the present invention.
Figure 10:
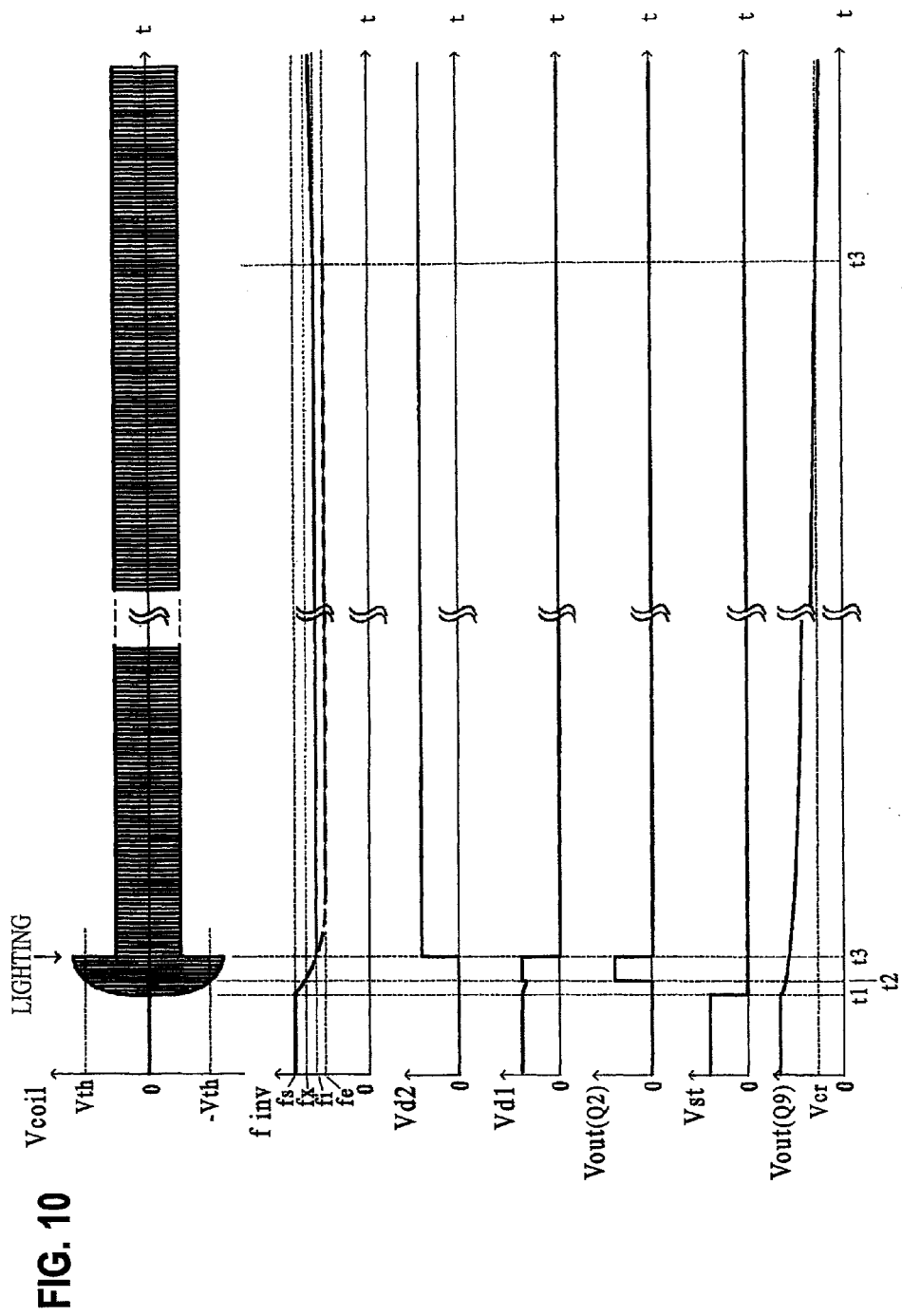
FIG. 10 is an operational waveform chart in the embodiment 1 of the present invention.

The following are descriptions of operations with reference to FIGS. 8 to 10. As shown in FIG. 9, there are four categorized operations in which A: the frequency sweep control, B: the lighting of the electrodeless discharge lamp 6, C: holding the switching frequency finv just after lighting, and D: controlling the switching frequency finv so as to be set the output power of the inverter 2 at a predetermined value.

(Operations A and B)

According to FIG. 10, the switch SW0 is switched from the ON-state to the OFF-state due to the shift of the start signal Vst from an H level to an L level, followed by starting the frequency sweep control. While the start signal Vst is in the H level (time t≦t1), the capacitor C12 is also charged with a predetermined voltage, in which the voltage V(C12) is in the H level.

After the time t=t1, the high-frequency voltage Vcoil is gradually increased by the frequency sweep control. When the high-frequency voltage Vcoil exceeds a predetermined voltage Vth, the output voltage Vout (Q2) of the operational amplifier Q2 is to be in the H level (time t=t2 to t3).

During the period from t1 to t2, the start signal Vst is in the L level. While, the voltage V(C12) keeps the H level due to a diode D3 for a reverse-current prevention. As a result, a voltage Vd1, which is a logical disjunction of the voltage V(C12) and the voltage V(Q2), keeps the H level during the period of the time t≦t3.

Note that, the charge in the capacitor C12 is discharged since the switch SW1 is switched from the OFF-state to the ON-state due to the shift of the voltage V(Q2) from the L level to the H level, and the voltage V(C12) is shifted from the H level to the L level. Moreover, when the high-frequency voltage Vcoil is decreased because of an impedance variation after the electrodeless discharge lamp 6 is lighted, it is possible to shift the voltage Vd1 from the H level to the L level starting from the point of the lighting of the electrodeless discharge lamp 6 by setting the output voltage V(Q2) of the operational amplifier Q2 to shift from the H level to the L level. Therefore, an output voltage Vd2 of the lighting detection circuit 14 is shifted from the L level to the H level due to the lighting of the electrodeless discharge lamp 6 by the function of the logical inverter Q5.

(Operation C)

Just after the lighting detection of the electrodeless discharge lamp 6 by the lighting detection circuit 14, a potential at an anode terminal of the diode D1 becomes lower than that at a cathode terminal, and a charge from a dc power supply E1 to the capacitor C1 is stopped because of the shift of the voltage Vd2 from the L level to the H level. Then, the switching frequency finv just after the lighting detection is maintained by keeping the voltage VC1 at both ends of the capacitor C1 at an approximately constant value by the function of the diode D1 for a reverse-current prevention.

(Operation D)

After the lighting detection of the electrodeless discharge lamp 6, the switching frequency finv is controlled by the current controller 17 only when the output power of the inverter 2 exceeds a predetermined value, thereby maintaining the output power at approximately constant value as the predetermined value. When the output power of the inverter 2 is less than the predetermined value, the switching frequency finv just after the lighting detection is continuously maintained.

Figure 11:
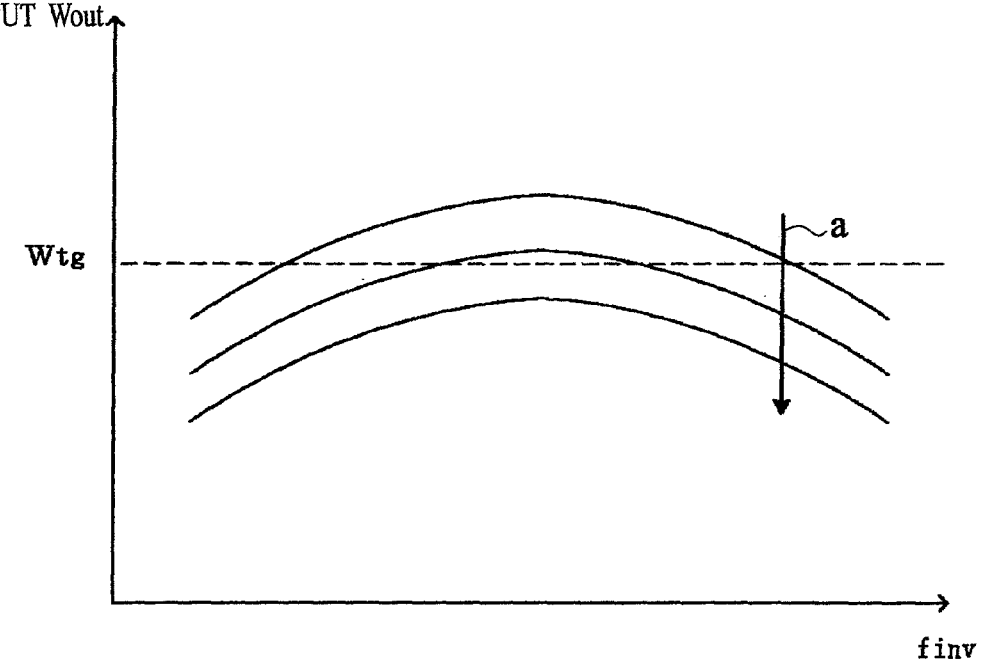
FIG. 11 is a chart showing output characteristics for an explanation of a problem of a conventional example.

For instance, FIG. 11 shows a case without the current controller 17 due to a property of the output power Wout of the inverter 2 with respect to the switching frequency finv. When a temperature of the electric-discharge lamp is lowered, the curve line may be shifted to a low-output side (in FIG. 11, an arrow indicated by a reference sign "a" shows a direction that the temperature of the electric-discharge lamp is lowered). As a result, a range of the switching frequency over a predetermined output power (=Wtg) may become narrower or completely disappear. Therefore, even when resulting in the output power Wout<Wtg just after lighting because of the low temperature, it is possible to maintain the output power at approximately constant value as the predetermined value by lighting while keeping the switching frequency finv just after the lighting detection, followed by operating the feedback control by the current controller 17 when resulting in the output power Wout>Wtg due to the increase of the temperature of the electric-discharge lamp.

Due to the operations A to D described above, the effect capable of starting and lighting stably can be achieved even when the load impedance of the electric-discharge lamp is varied. Also, the advantage of omitting the variable resistor VR conventionally used for absorbing the deviations can be achieved since an influence for the start operation of the end point frequency fe in the frequency sweep control is lessened by operating the above-mentioned control.

Figure 12:
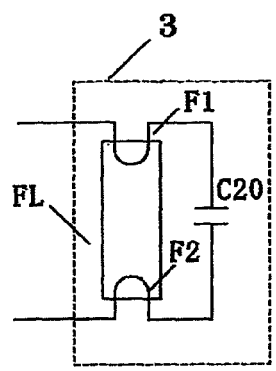
FIG. 12 is a circuit diagram showing another example of a load constitution of the present invention.

In addition, in the operations according to the embodiment 1, as shown in FIG. 12, the load 3 may be other electric-discharge lamps such as a construction including an electric-discharge lamp (fluorescent light) FL having filaments F1 and F2 and a capacitor C20, and the like, and can obtain the similar effect.

For convenience, the switching frequency finv to be held may be shifted to the low frequency side within a harmless range if it is adjacent to the switching frequency finv just after the lighting detection.

(Embodiment 2)

Figure 13:
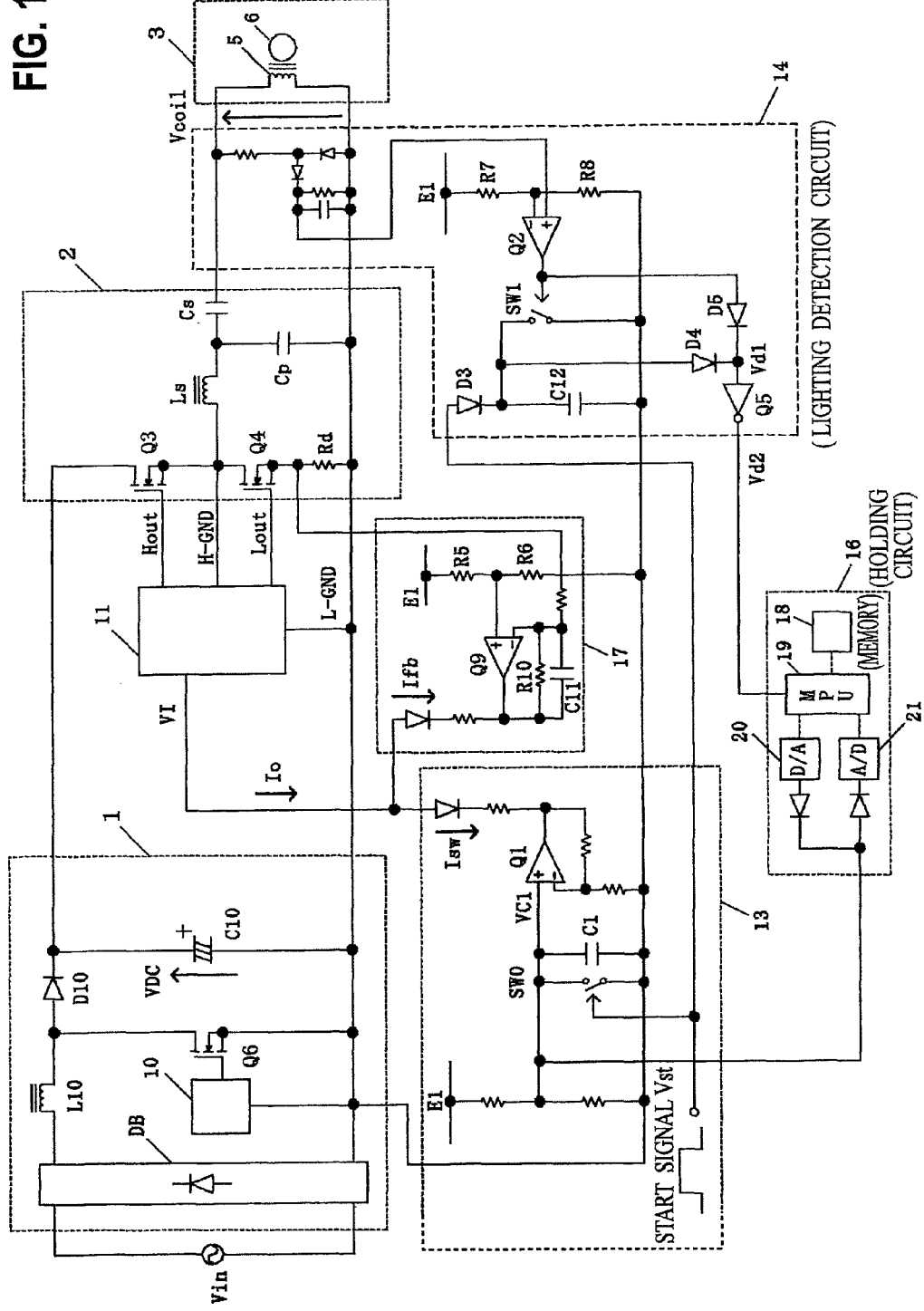
FIG. 13 is a circuit diagram showing a constitution in an embodiment 2 of the present invention.

FIG. 13 shows a constitution of an embodiment 2. Explanations of constitutions, operations and effects similar to the embodiment 1 are omitted. A difference from the embodiment 1 is what the holding circuit 16 stores the switching frequency finv just after the lighting as digital data. Also, the holding circuit 16 includes a microprocessor (MPU) 19, a memory 18, an A/D converter 21 for converting an analog voltage into digital data, a D/A converter 20 for converting digital data into an analog voltage, and the like.

The following are descriptions of operations. The output voltage Vd2 of the lighting detection circuit 14 is shifted from the L level to the H level due to the lighting of the electrodeless discharge lamp 6. By treating it as a trigger, the voltage VC1 at both ends of the capacitor C1 is stored and held in the memory 18 as digital data via the A/D converter 21 by the function of the MPU 19. Then, the stored data is reconverted into the analog voltage value via the D/A converter 20, followed by applying to the capacitor Cl. That means it is possible to maintain the voltage VC1 at both ends of the capacitor Cl at the voltage value just after lighting, which means maintaining the switching frequency finv at the point. Compared with the case of the embodiment 1 (maintaining at the analog voltage value at both ends of the capacitor C1), the effect capable of holding for a longer period can be achieved.

(Embodiment 3)

Figure 14:
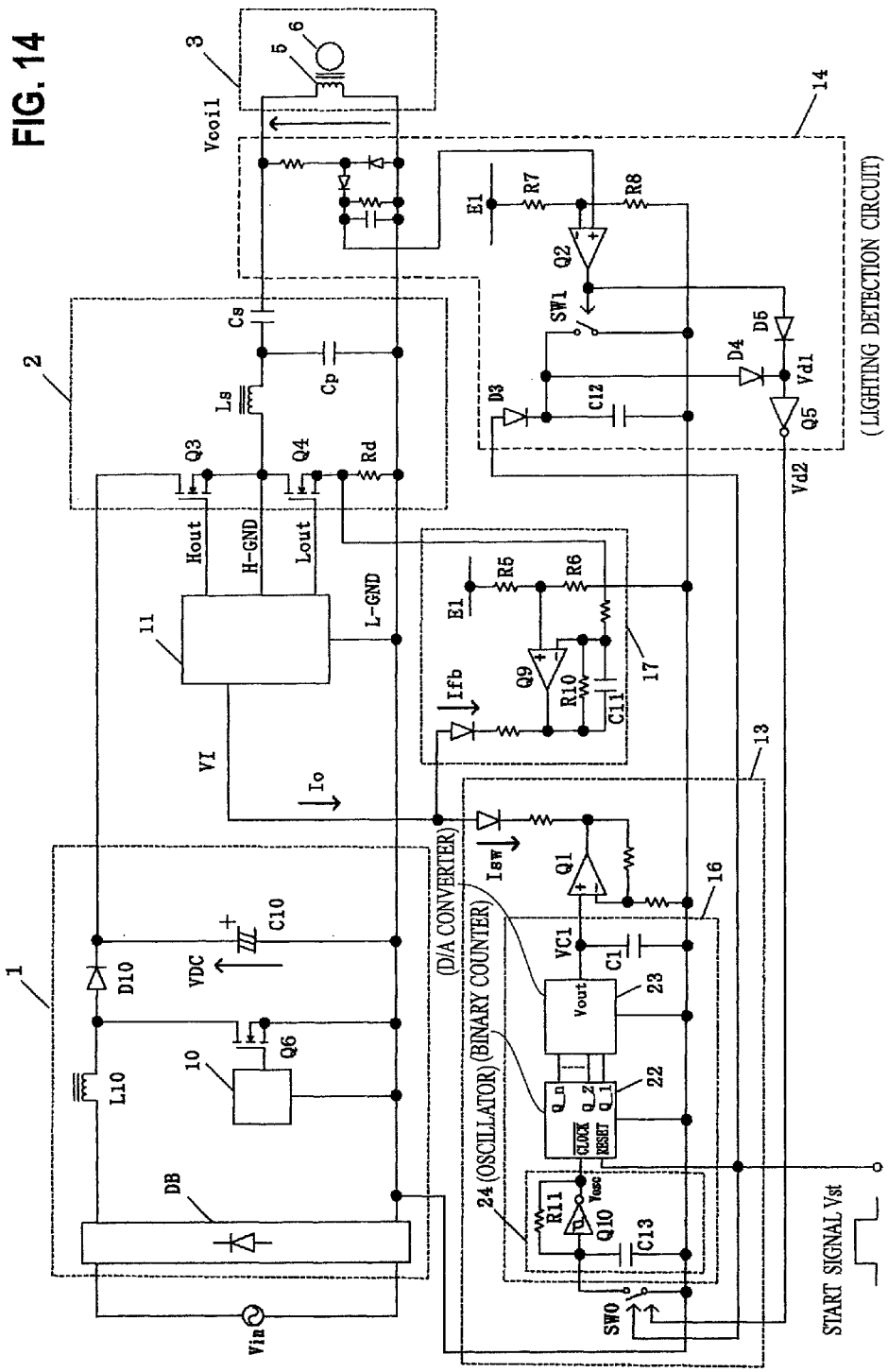
FIG. 14 is a circuit diagram showing a constitution in an embodiment 3 of the present invention.

FIG. 14 shows a constitution of an embodiment 3. Explanations of constitutions, operations and effects similar to the embodiment 2 are omitted. A difference from the embodiment 2 is what an oscillator 24, a binary counter 22 (e.g. CMOS IC: 4024), a D/A converter 23, and the like are used as the holding circuit 16. The oscillator 24 includes a Schmitt trigger logical inverter Q10 (e.g. CMOS IC: 74HC14), a capacitor C13, and the resistor R11. By use of hysteresis characteristics of an input threshold voltage of the Schmitt trigger logical inverter Q10, a square wave voltage oscillation is performed. An oscillation frequency is determined by a time constant of the capacitor C13 and the resistor R11, and a hysteresis width.

Figure 15:
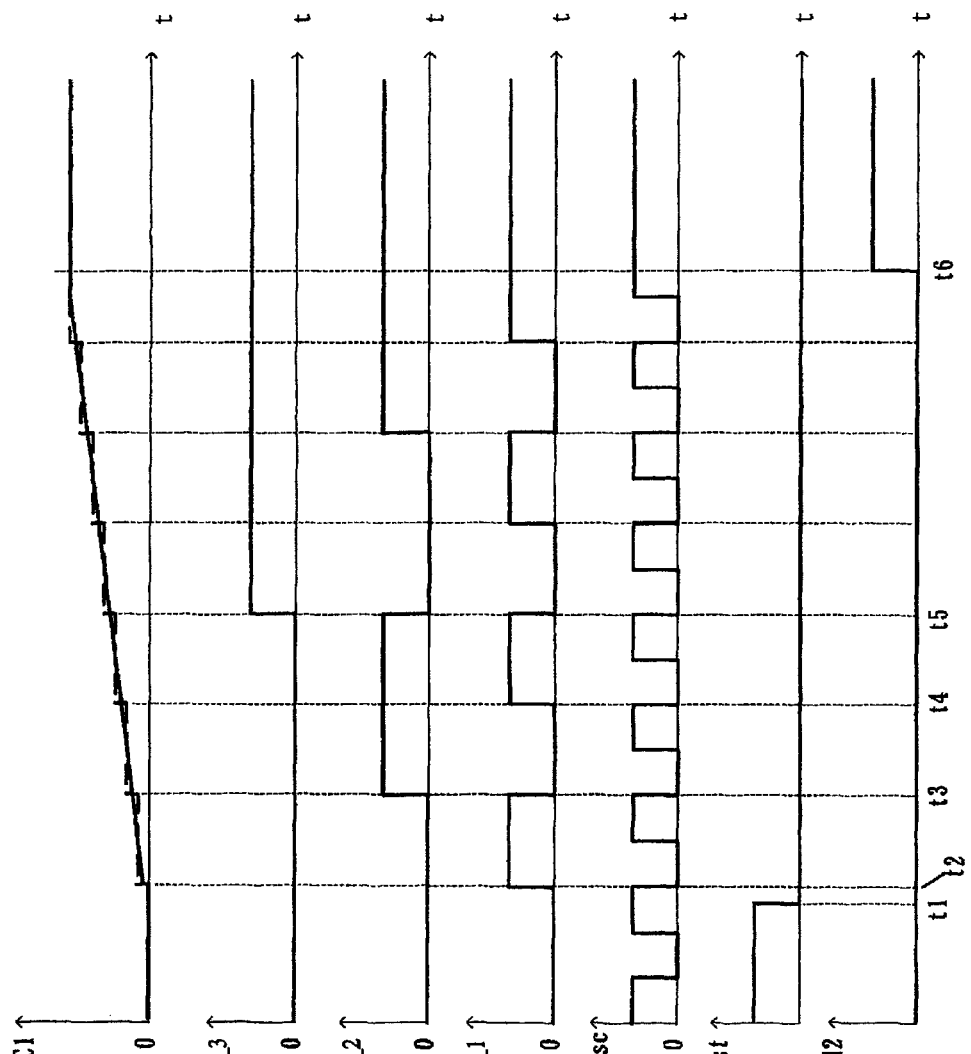
FIG. 15 is an operational waveform chart in the embodiment 3 of the present invention.

The following are descriptions of operations with reference to FIG. 15. Due to a shift of the start signal Vst from the H level to the L level (time t=t1), a reset of the binary counter 22 is released, and an output voltage Vosc of the oscillator 24 is applied to the binary counter 22, followed by starting counting operation. The output of the binary counter 22 is converted into an analog voltage via the D/A converter 23 and the capacitor C1. Then, the frequency sweep is operated by gradually increasing the voltage VC1.

The output voltage Vd2 of the lighting detection circuit 14 is shifted from the L level to the H level due to the lighting of the electrodeless discharge lamp 6. By treating it as a trigger, the switch SW0 is shifted from the OFF-state to the ON-state, and the oscillation of the oscillator 24 is stopped. As a result, the output voltage of the D/A converter 23 is held since the counting operation is stopped. Thus, it is possible to maintain the voltage VC1 at both ends of the capacitor Cl at the voltage value just after lighting, which means maintaining the switching frequency finv at the point. That means the voltage value is held as digital data by the binary counter 22 according to the present embodiment.

In the present embodiment, there is the advantage of operability at low cost using only general-purpose components without the MPU 19 compared with the embodiment 2.

(Embodiment 4)

Figure 16:
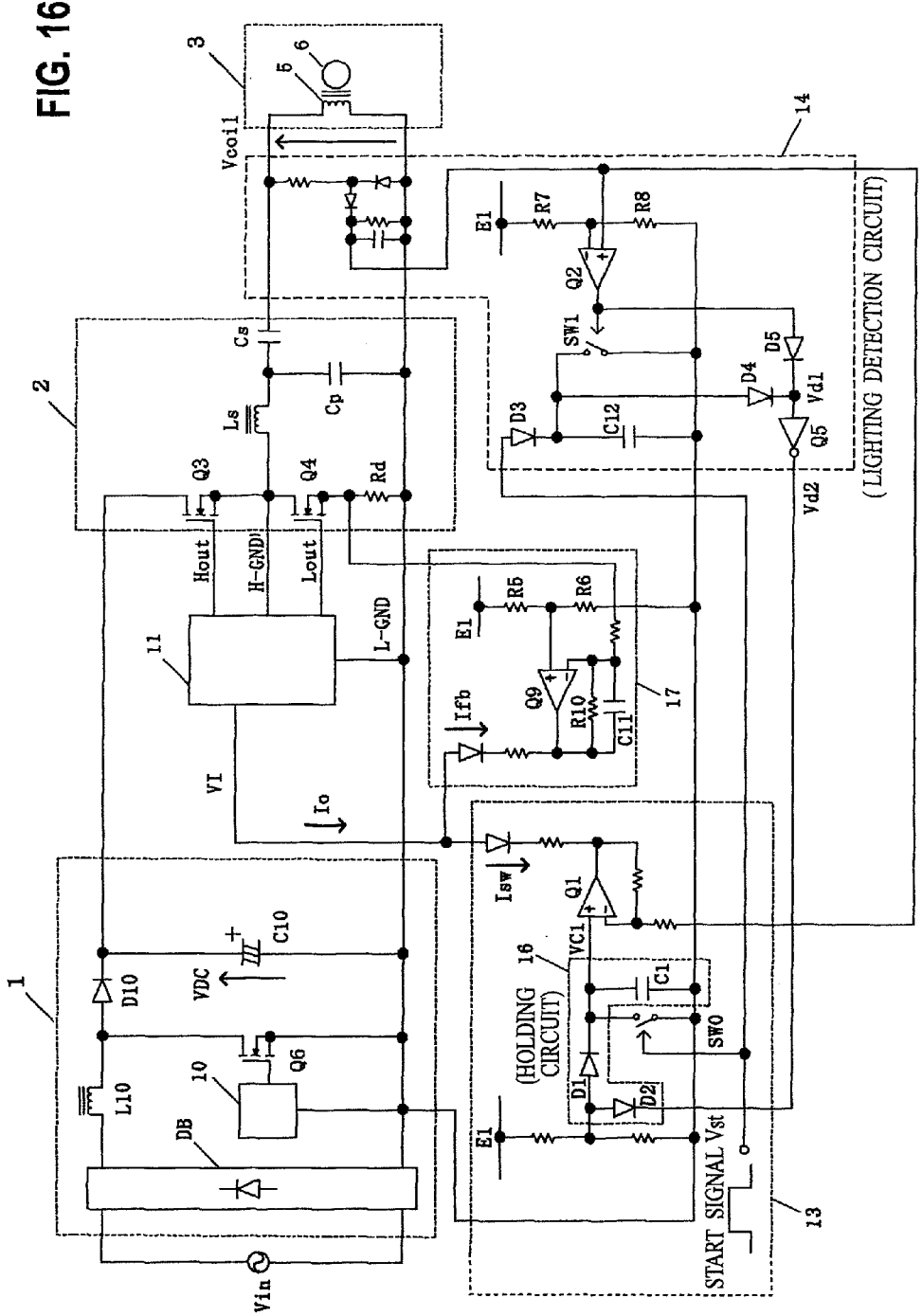
FIG. 16 is a circuit diagram showing a constitution in an embodiment 4 of the present invention.

FIG. 16 shows a constitution of an embodiment 4. Explanations of constitutions, operations and effects similar to the embodiment 1 are omitted. A difference from the circuit in the embodiment 1 (FIG. 8) is what the lighting detection circuit 14 inputs the detected voltage of the output voltage Vcoil into an inverting terminal of the operational amplifier Q1 of the voltage controller 13. Therefore, by operating the feedback control to comply a voltage value variation of a non-inverting terminal of the operational amplifier Q1, the frequency sweep is to be controlled so as to approach a certain target value. Thus, the effect capable of starting stably can be achieved since an excess of the output voltage Vcoil and the like can be prevented due to a gradual start-up of the output voltage Vcoil even when a resonance property at the starting of the electrodeless discharge lamp 6 in the oscillator including the inverter 2 and the load 3 is tilted steeply.

(Embodiment 5)

Figure 17:
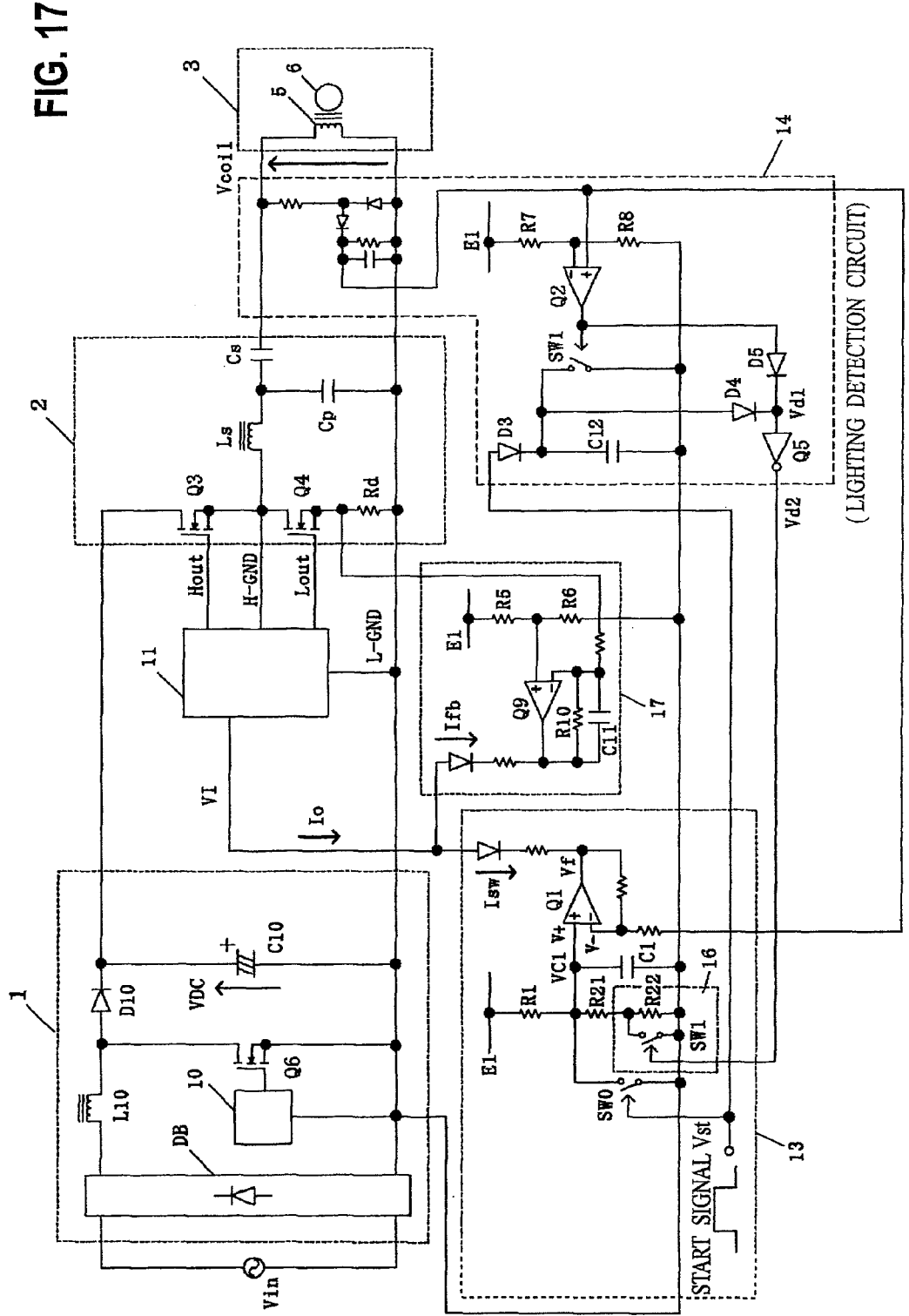
FIG. 17 is a circuit diagram showing a constitution in an embodiment 5 of the present invention.

FIG. 17 shows a constitution of an embodiment 5. Explanations of constitutions, operations and effects similar to the embodiment 4 are omitted. Differences from the circuit in the embodiment 4 (FIG. 16) are what the present embodiment is configured to input the dc voltage E1 divided by the resistors R1, R21 and R22 into the non-inverting terminal (voltage V+) of the operational amplifier Q1 in the voltage controller 13, include the holding circuit 16 including the resistor R22 and the switch SW1, and decrease the voltage V+ by being conducted through the switch SW1 connected in parallel to the resistor R22 when the lighting is detected by the lighting detection circuit 14.

Figure 4:
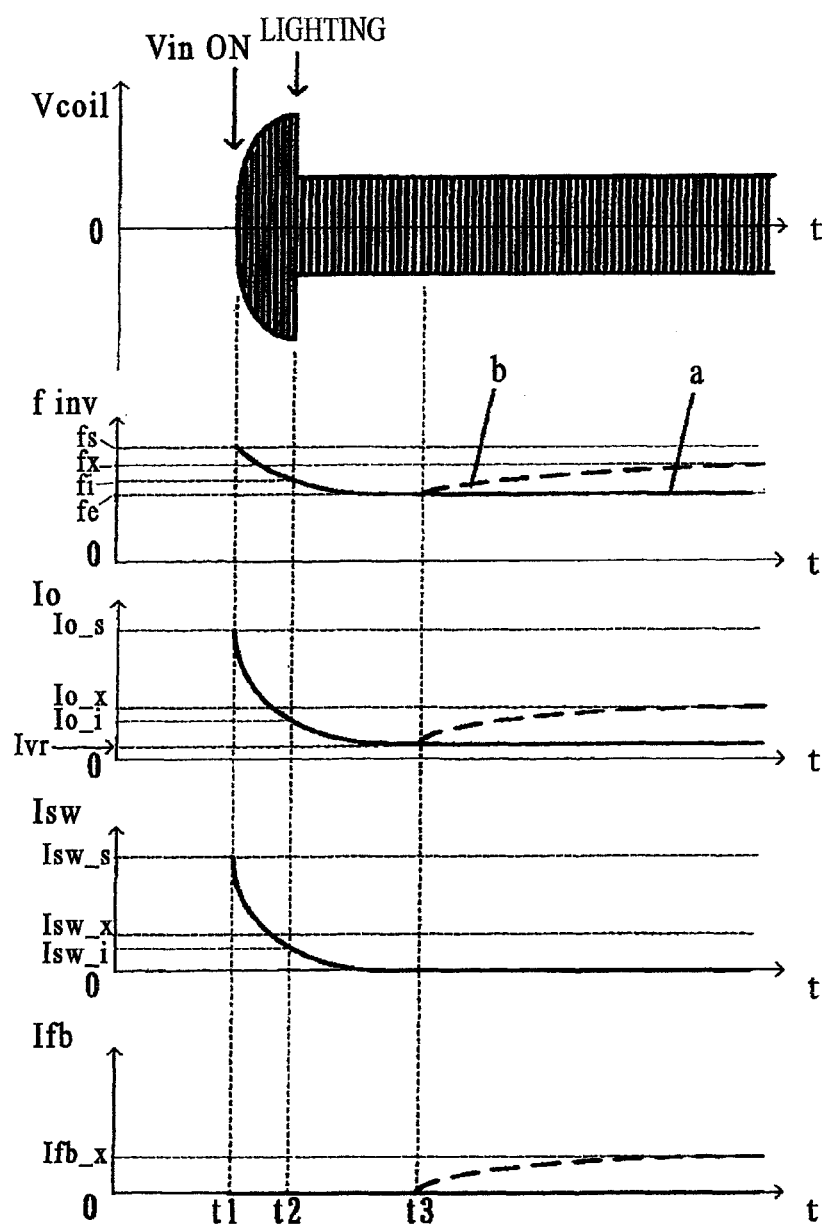
FIG. 4 is a waveform chart for an explanation of an operation at a start-up of a conventional example.
Figure 5:
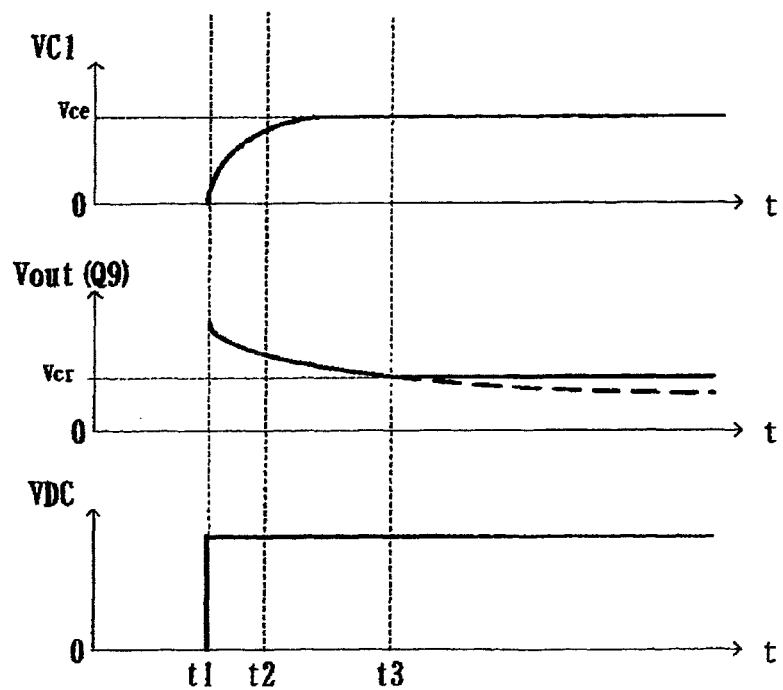
FIG. 5 is a waveform chart for an explanation of an operation at a start-up of a conventional example.
Figure 7:
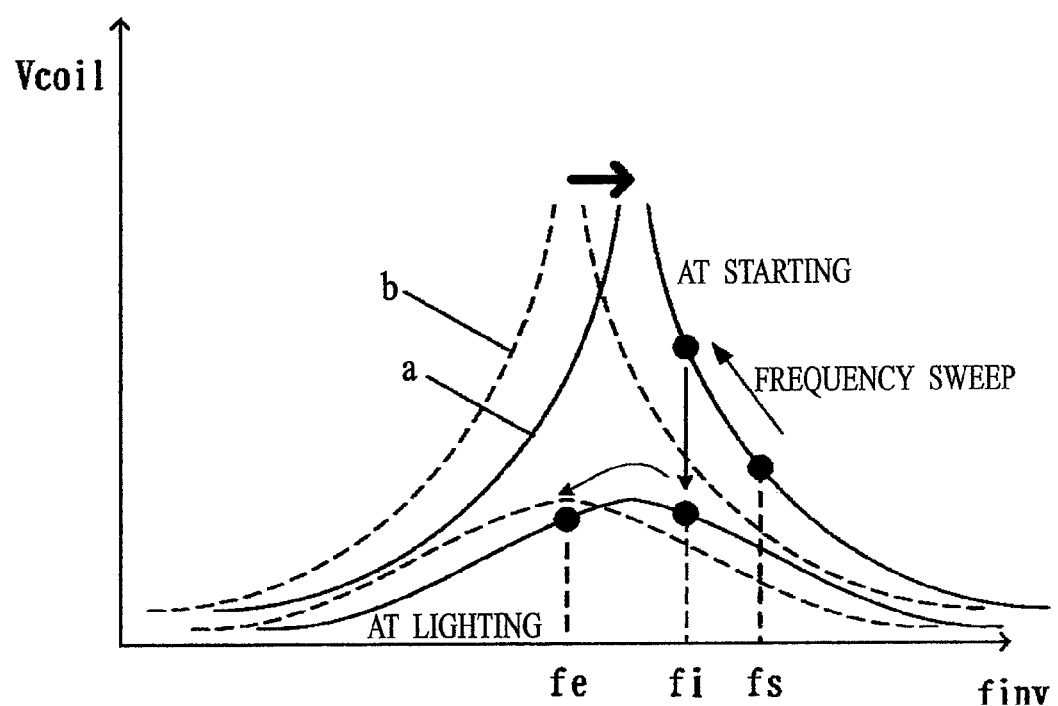
FIG. 7 is a chart showing characteristics of resonance curve lines for an explanation of a problem of a conventional example.
Figure 18:
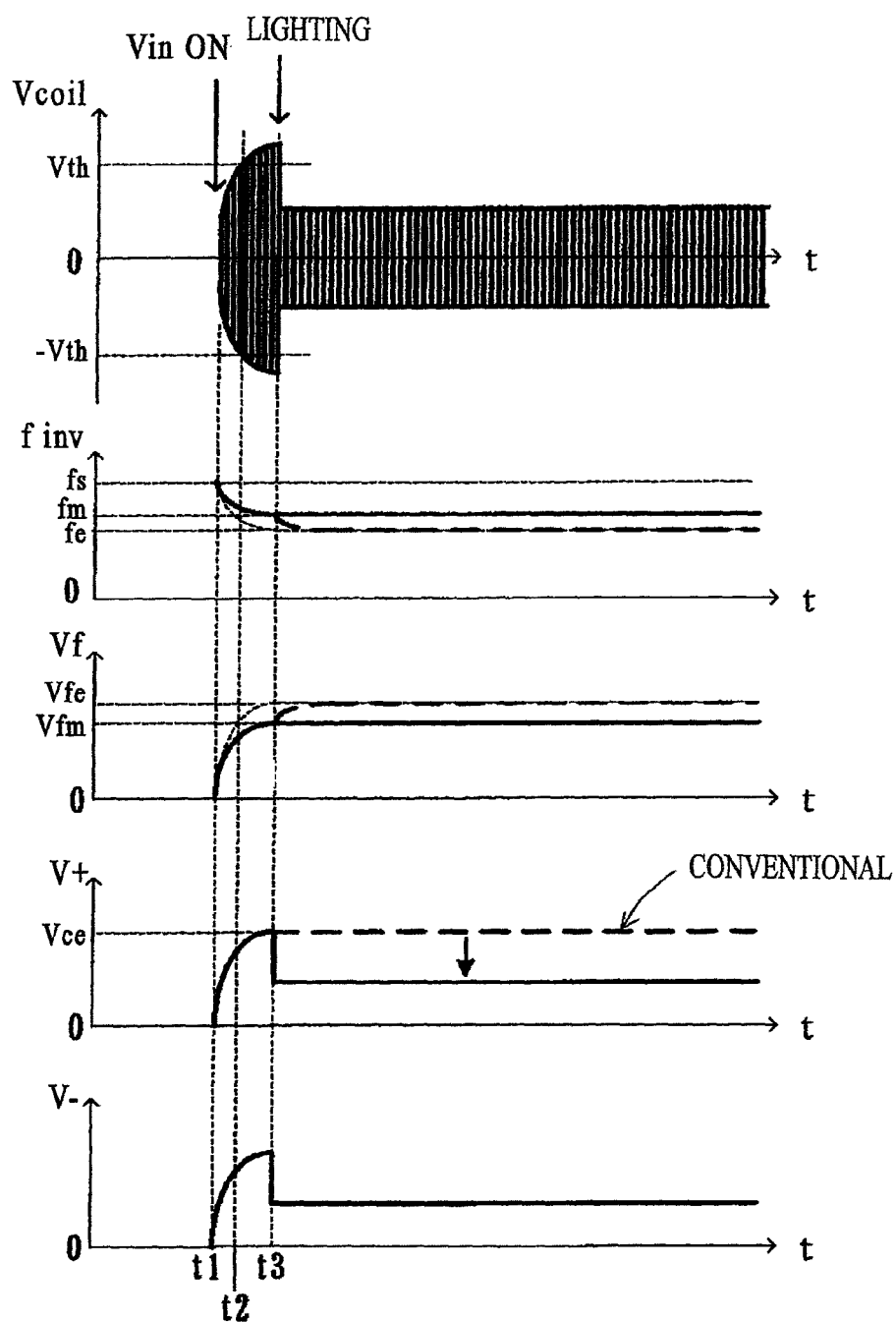
FIG. 18 is an operational waveform chart in the embodiment 5 of the present invention.
Figure 19:
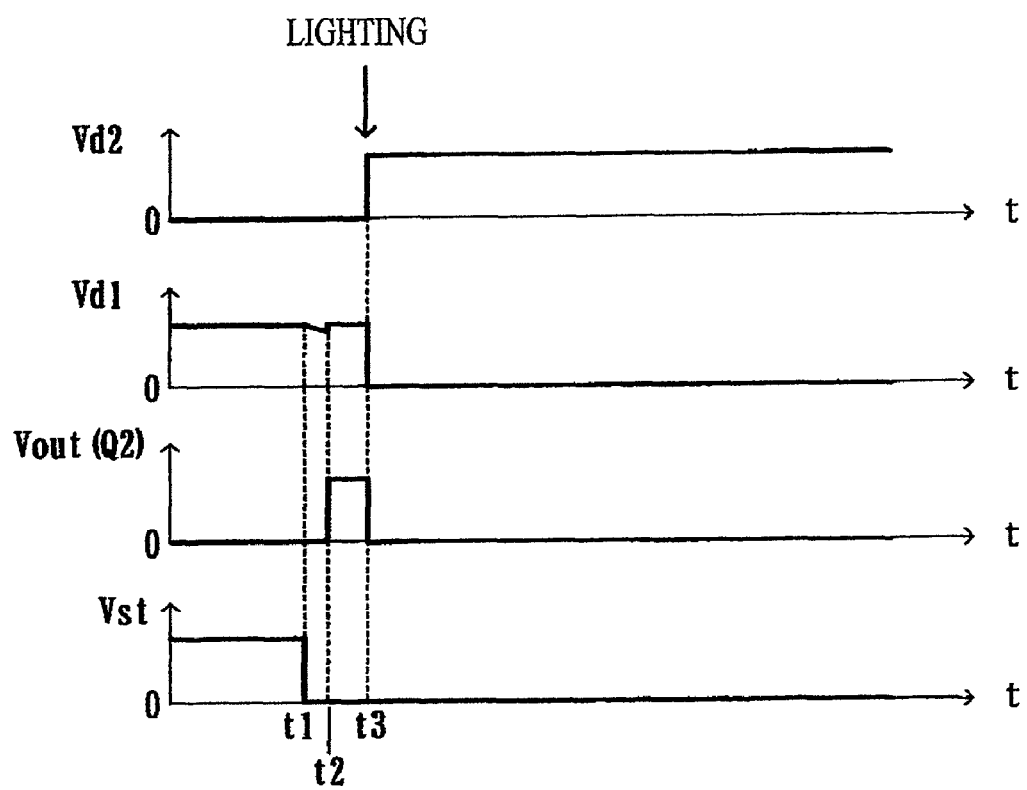
FIG. 19 is an operational waveform chart in the embodiment 5 of the present invention.

FIGS. 18 and 19 show operational waveform charts. In general, a voltage V− of the inverting terminal of the operational amplifier Q1, which is a divided voltage of the output voltage Vcoil, is decreased by the impedance variation after the electrodeless discharge lamp 6 is lighted. Thus, the voltage V− becomes relatively smaller than the voltage V+, thereby increasing an output voltage Vf of the operational amplifier Q1 again. However, when the impedance variation is occurred, e.g. when the metal housing approaches the electrodeless discharge lamp 6, the end point frequency fe of the frequency sweep may become lower than the peak of the resonance curve line when lighting (refer to FIGS. 4 and 7).

In the present embodiment, it is possible to hold the voltage Vf, and maintain the switching frequency finv at the value just after lighting by decreasing the voltage V+ by turning on the switch SW1 in order to comply the voltage variation of the voltage V− after the electrodeless discharge lamp 6 is lighted. Therefore, the effect capable of starting and lighting stably can be achieved even when operating the feedback control for the output voltage Vcoil.

(Embodiment 6)

Figure 20:
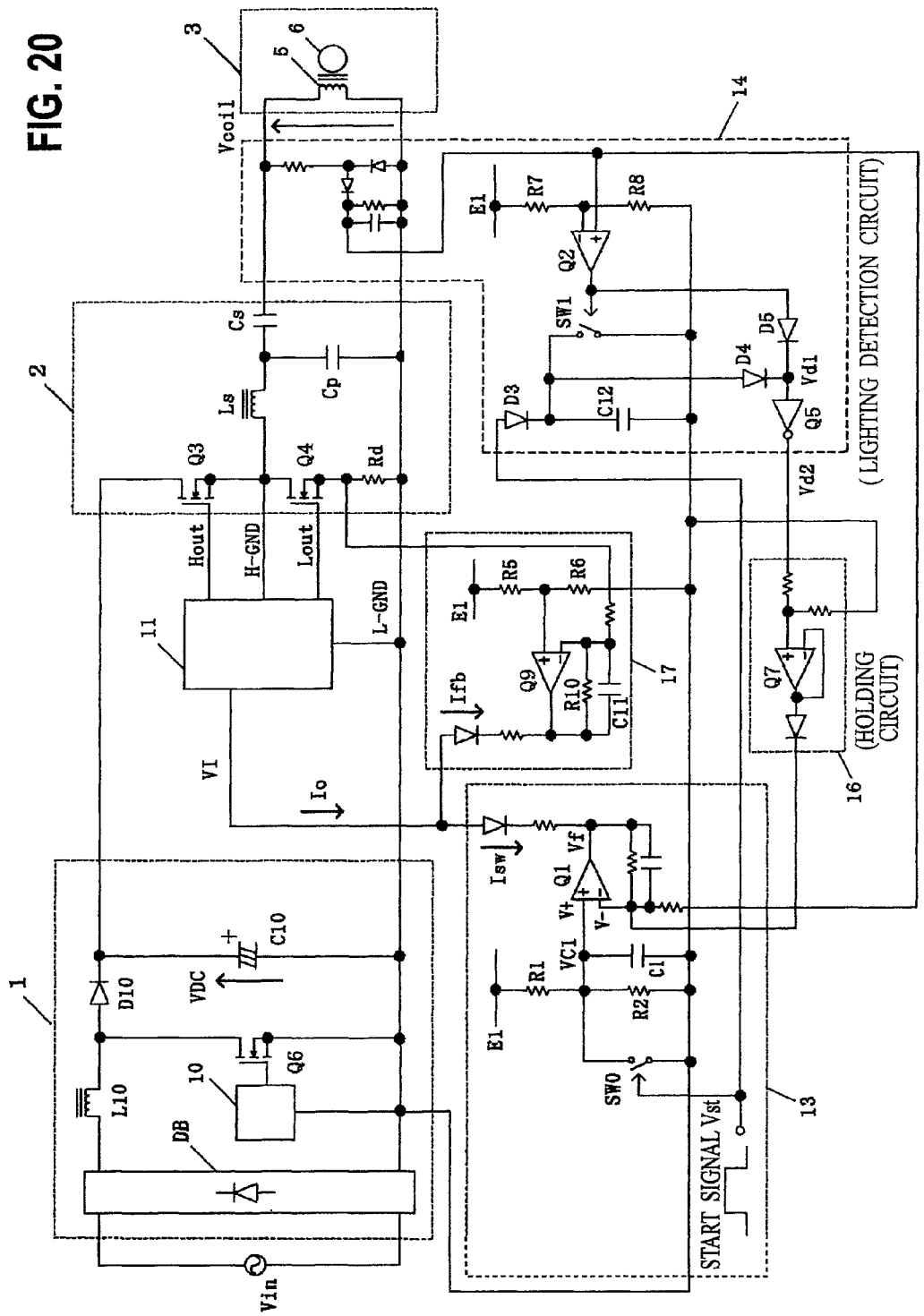
FIG. 20 is a circuit diagram showing a constitution in an embodiment 6 of the present invention.

FIG. 20 shows a constitution of an embodiment 6. Explanations of constitutions, operations and effects similar to the embodiment 5 are omitted. A difference from the circuit in the embodiment 5 (FIG. 17) is what the present embodiment includes the holding circuit 16 that applies a voltage to the inverting terminal of the operational amplifier Q1 by receiving the output from the lighting detection circuit 14, and includes an operational amplifier Q7, a resistor, and a diode.

Figure 21:
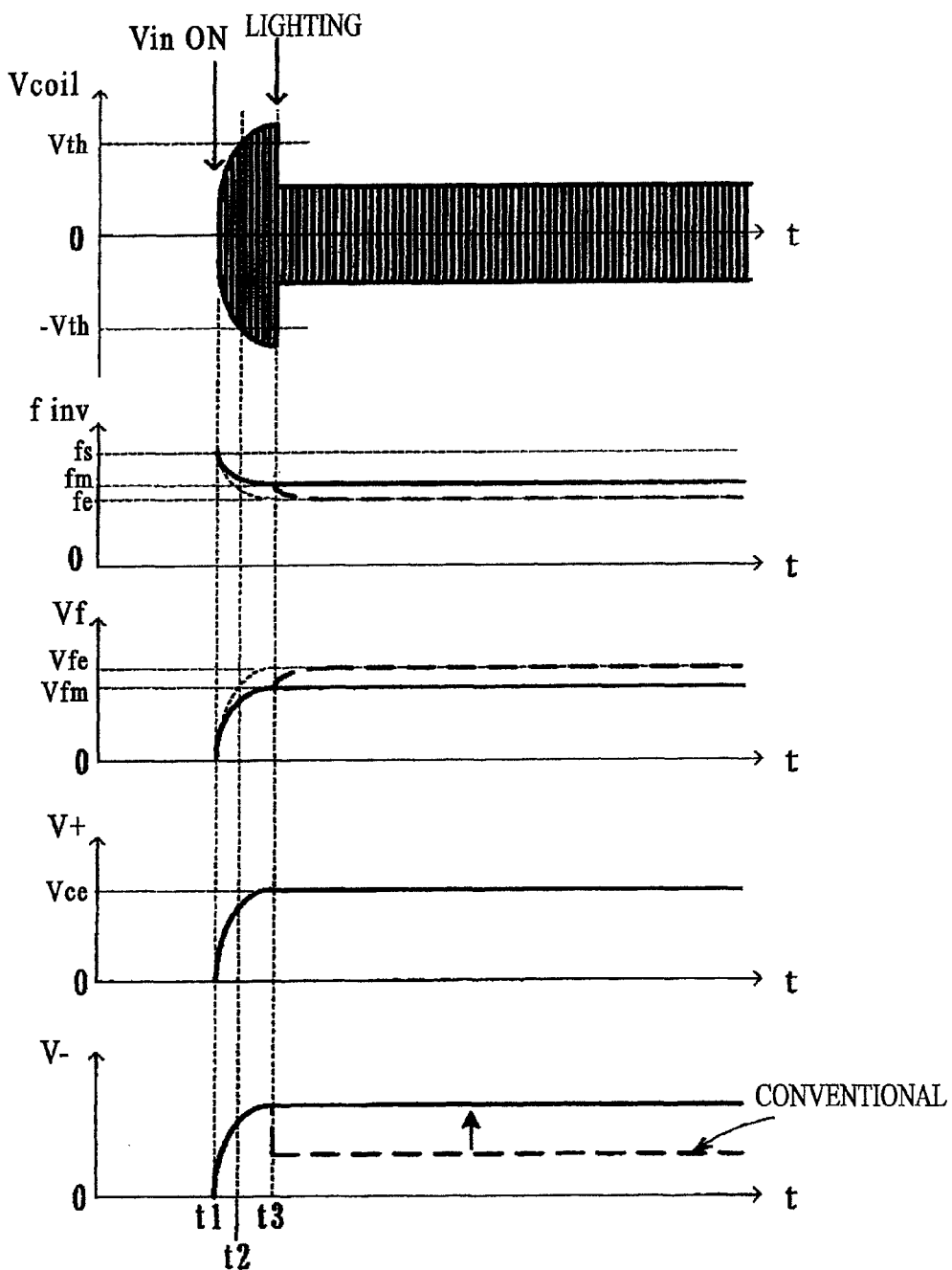
FIG. 21 is an operational waveform chart in the embodiment 6 of the present invention.
Figure 22:
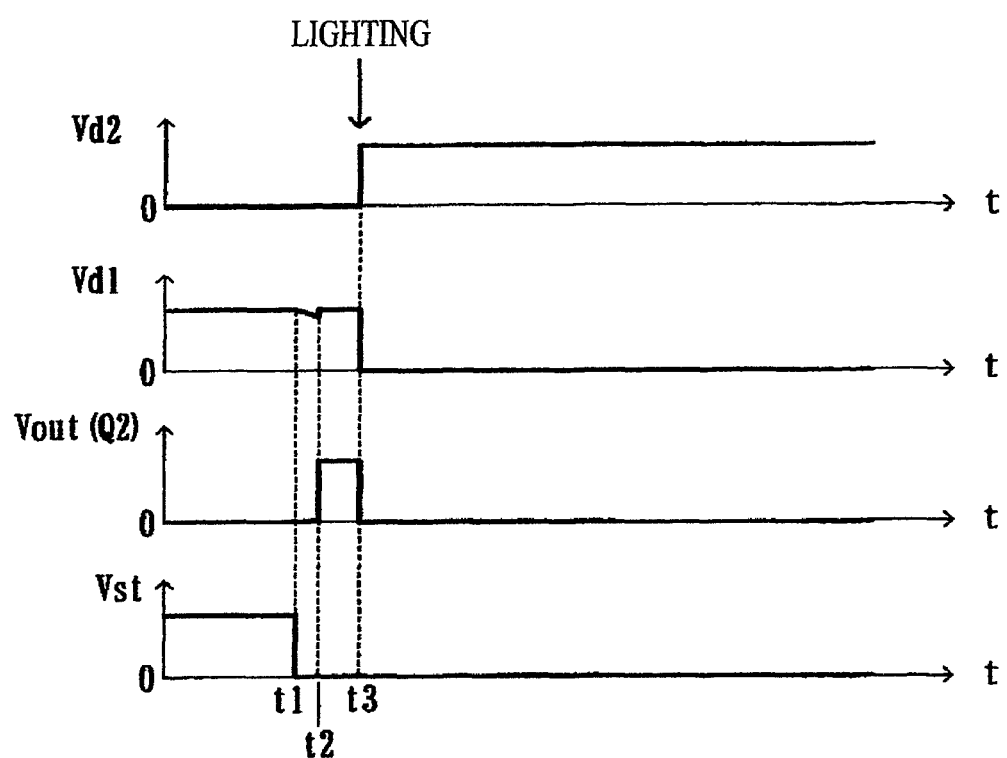
FIG. 22 is an operational waveform chart in the embodiment 6 of the present invention.

FIGS. 21 and 22 show operational waveform charts. It is possible to hold the voltage Vf, and maintain the switching frequency finv at the value just after lighting similar to the embodiment 5 by increasing the voltage V− via the holding circuit 16, in order to comply the voltage variation of the voltage V+ after the electrodeless discharge lamp 6 is lighted. In addition, the effect similar to the embodiment 5 can be achieved.

(Embodiment 7)

Figure 23:
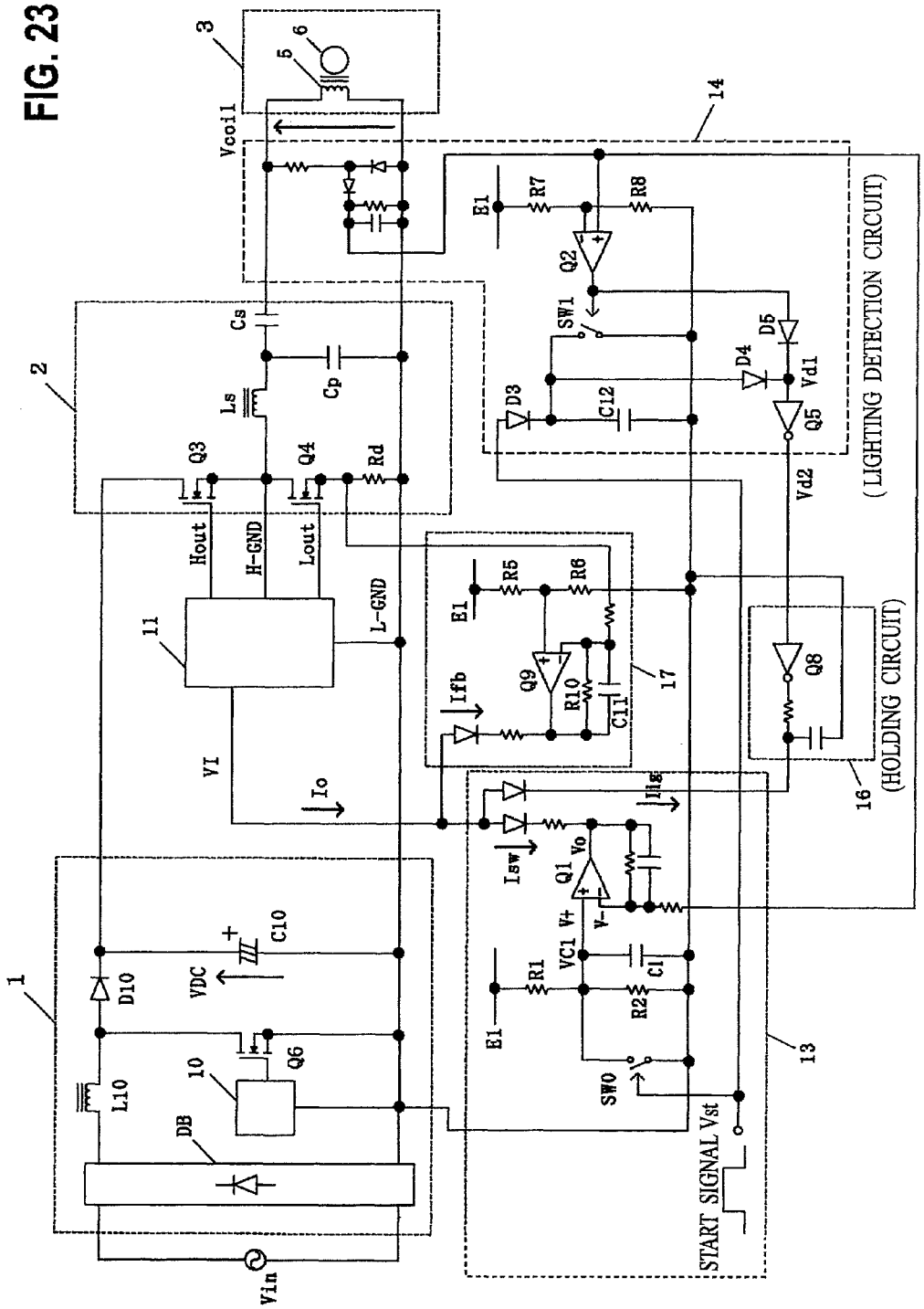
FIG. 23 is a circuit diagram showing a constitution in an embodiment 7 of the present invention.

FIG. 23 shows a constitution of an embodiment 7. Explanations of constitutions, operations and effects similar to the embodiment 5 are omitted. A difference from the circuit in the embodiment 5 (FIG. 17) is what the present embodiment includes the holding circuit 16 that extracts a current (Iig) from the input terminal of the drive circuit 11 by receiving the input from the lighting detection circuit 14, and includes a logical inverter Q8, a capacitor, and a resistor.

Figure 24:
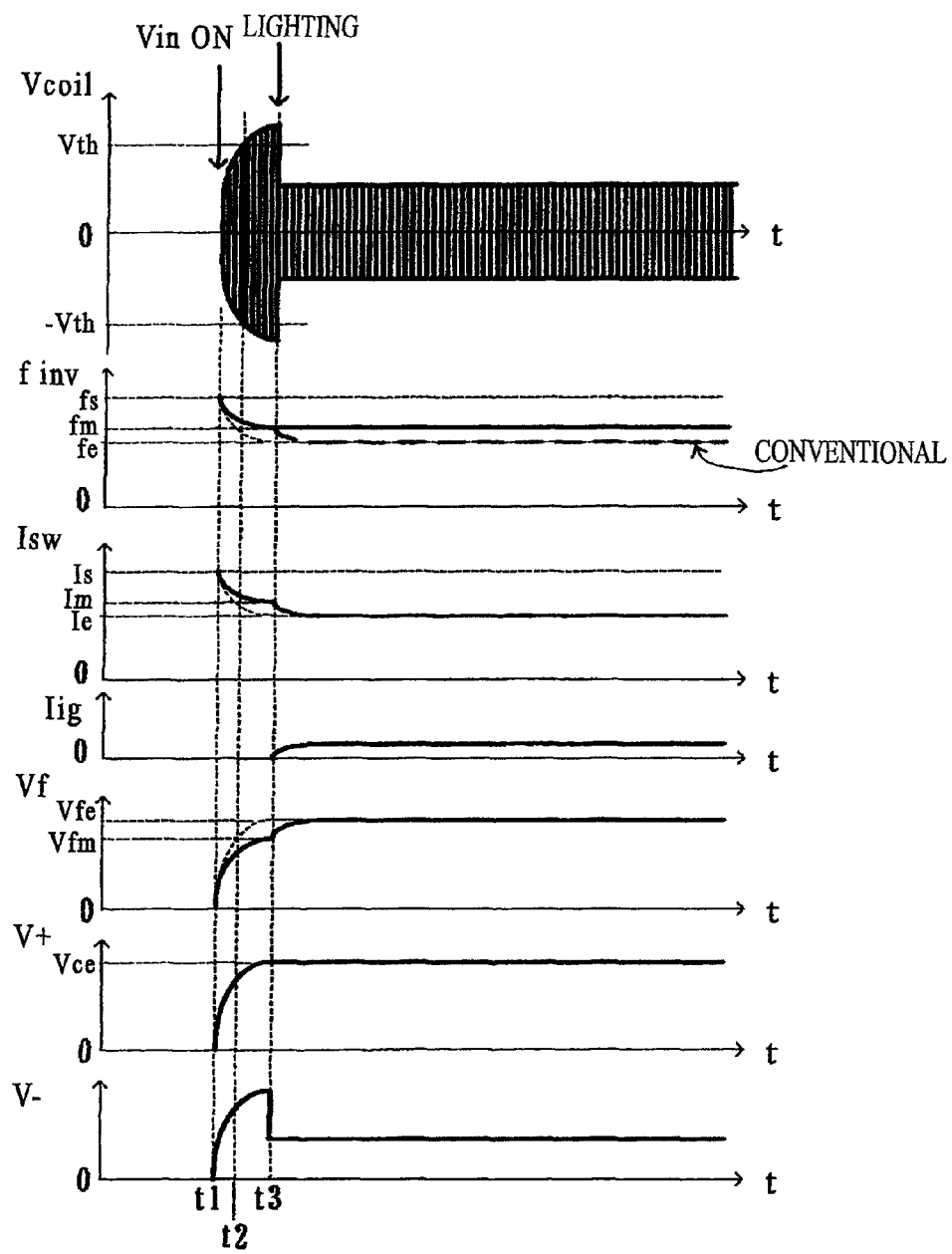
FIG. 24 is an operational waveform chart in the embodiment 7 of the present invention.
Figure 25:
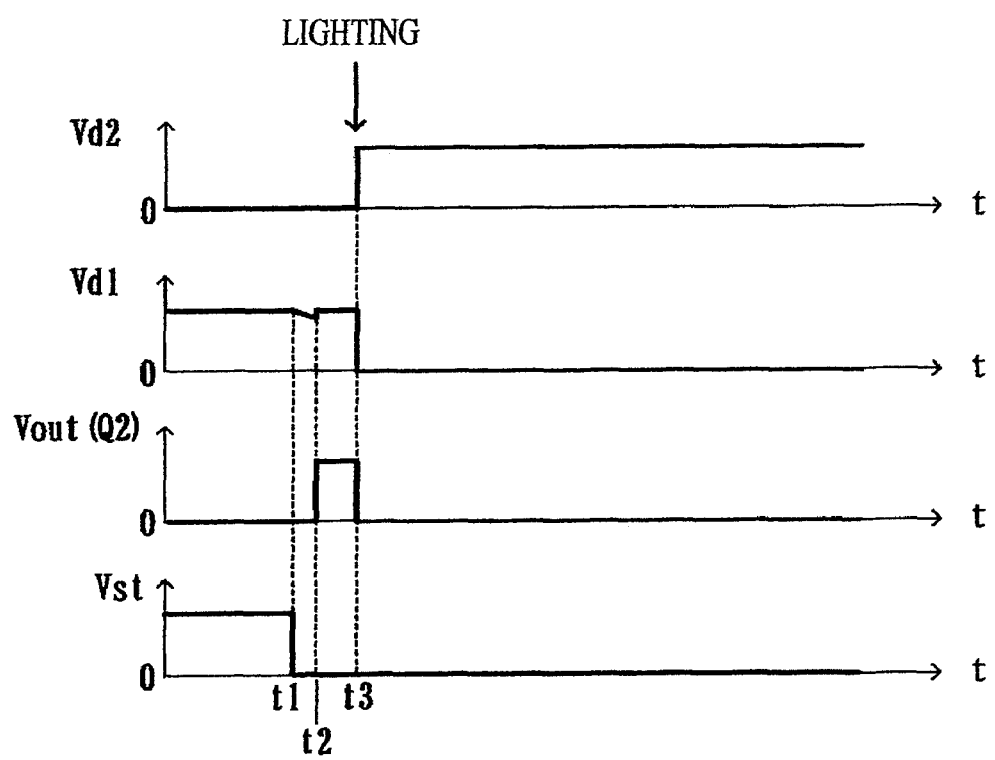
FIG. 25 is an operational waveform chart in the embodiment 7 of the present invention.

FIGS. 24 and 25 show operational waveform charts. It is possible to equivalently hold the voltage Vf, i.e. maintain the switching frequency finv at the value just after lighting, by shifting the output of the logical inverter Q8 from the H level to the L level, and extracting the current Iig from the holding circuit 16 to supplement the decrease of the current Isw caused by the difference between the voltages V+ and V− after the electrodeless discharge lamp 6 is lighted. Thus, the similar effect can be achieved.

(Embodiment 8)

Figure 26:
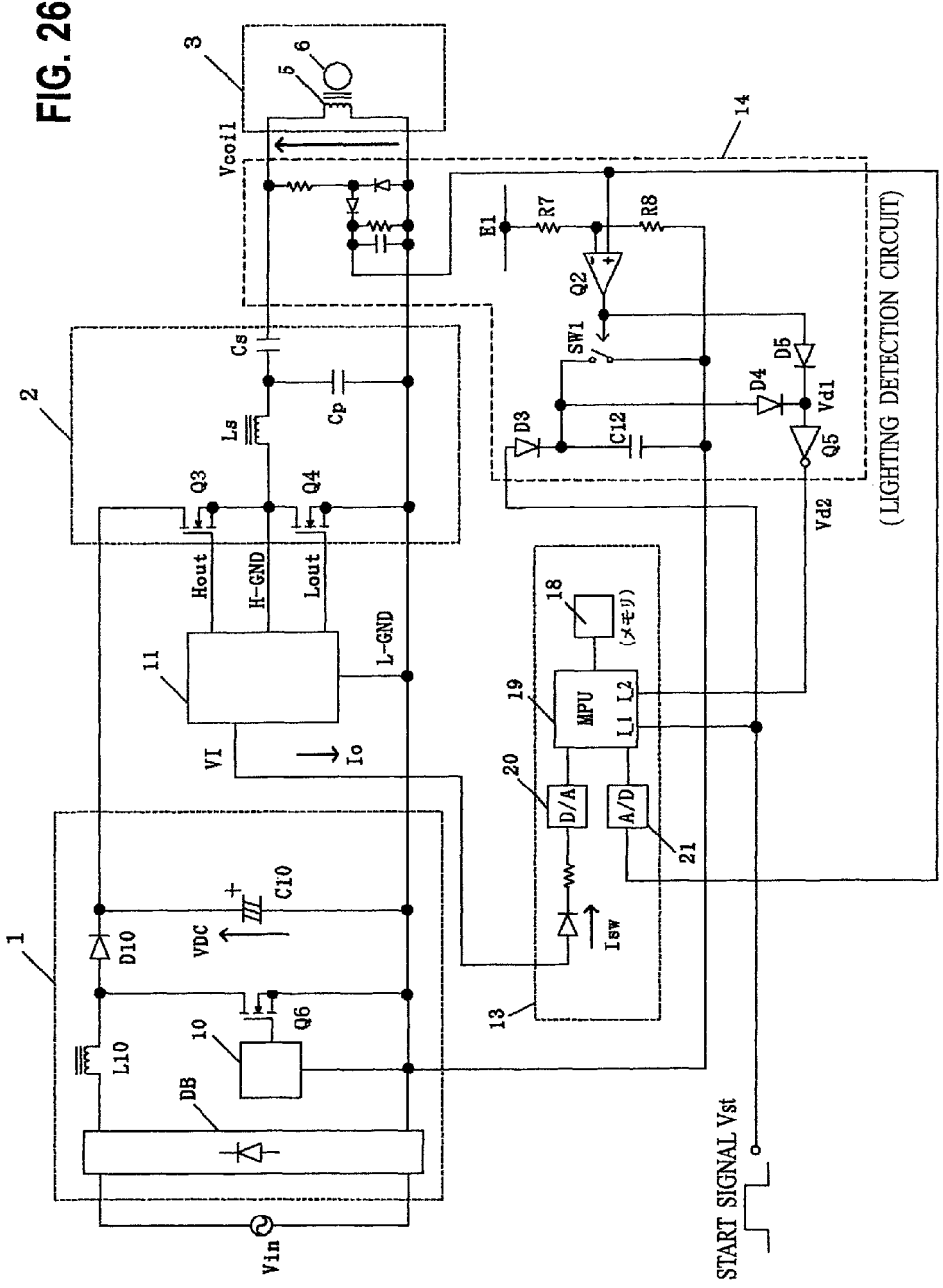
FIG. 26 is a circuit diagram showing a constitution in an embodiment 8 of the present invention.

FIG. 26 shows a constitution of an embodiment 8. Explanations of constitutions, operations and effects similar to the embodiment 5 are omitted. A difference from the circuit in the embodiment 5 (FIG. 17) is what the voltage controller 13 includes the MPU 19, the memory 18, the A/D converter 21 for converting an analog voltage into digital data, the D/A converter 20 for converting digital data into an analog voltage, and the like. An input port I_1 of the MPU 19 determines an H/L status of the start signal Vst, and an input port I_2 determines an H/L status of the output signal Vd2 of the lighting detection circuit 14. The divided voltage of the output voltage Vcoil is converted into digital data via the A/D converter 21 and inputted into the MPU 19, and the output from the MPU 19 is outputted into the drive circuit 11 as an analog voltage value via the D/A converter 20. The function of the current controller 17 provided in the embodiment 5, which controls the switching frequency so as to maintain the output power of the electrodeless discharge lamp 6 at an approximately constant target value, is combined with the voltage controller 13. Thus, the similar operations can be performed by use of the MPU 19. Also, the effect capable of more easily and accurately maintaining the switching frequency finv at the value just after lighting can be achieved compared with the case using analog components such as an operational amplifier, and the advantage of reducing the number of components can be obtained. Note that, the function of the lighting detection circuit 14 may be combined with the voltage controller 13, which achieves the further reduction of the number of components.

(Embodiment 9)

The present embodiment includes the electrodeless discharge lamp 6 according to each embodiment 1 to 8, in which at least one of the buffer gases including Kr.

Figure 27:
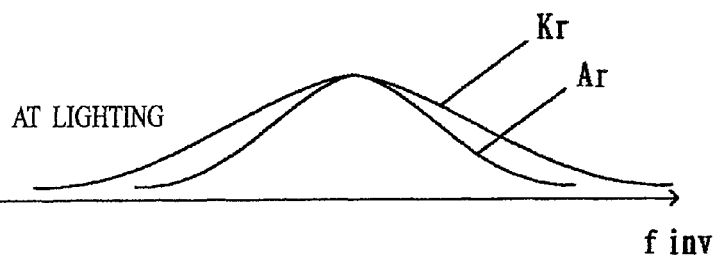
FIG. 27 is a chart showing characteristics of resonance curve lines when lighting in an embodiment 9 of the present invention.

FIG. 27 shows resonance curve lines when the electrodeless discharge lamp 6 is lighted. When Kr is used as an inactive gas to be filled in the electrodeless discharge lamp 6, the load impedance is lowered more, and the resonance curve line can be broader compared with the case using Ar. Thus, the effect capable of reducing a sensitivity of the output power with respect to the switching frequency, and the effect capable of more accurately and stably performing the respective operations described in the above-mentioned embodiments 1 to 8, can be achieved.

(Embodiment 10)

Figure 6:
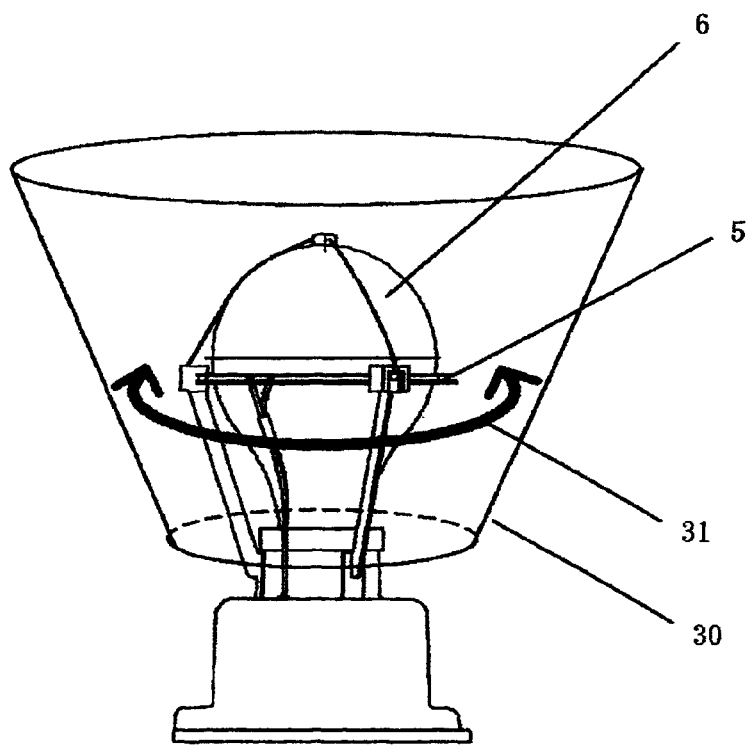
FIG. 6 is a perspective view showing a fixture constitution for an explanation of a problem of a conventional example.
Figure 28:
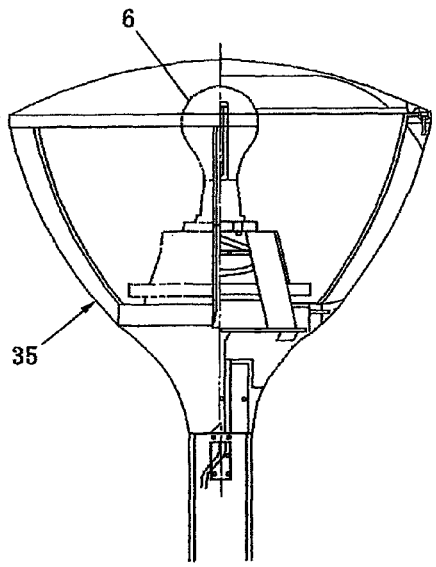
FIG. 28 is a partial cross section front view of a street light in an embodiment 10 of the present invention.
Figure 29:
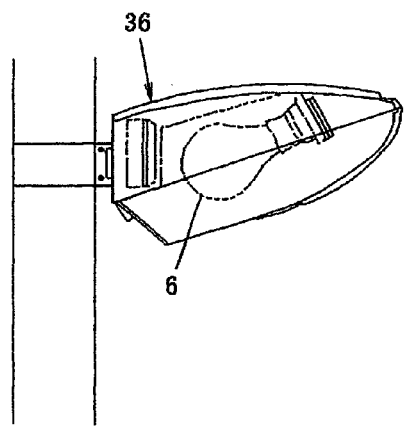
FIG. 29 is a side view of a security light in the embodiment 10 of the present invention.

The electric-discharge lamp lighting devices according to the embodiments 1 to 9 can be widely used for lighting fixtures such as a street light 35 in FIG. 28, a security light 36 in FIG. 29, or a downlight (FIG. 6), and the effects similar to the above-described respective embodiments can be obtained.

Industrial Applicability

According to the present invention, the first frequency controller includes a holding means that holds the switching frequency just after the lighting detection when the output power is smaller than a target value at the lighting detection. Therefore, the effect capable of stably starting and lighting can be achieved even when the load impedance of the electric-discharge lamp is varied.

The invention claimed is:

1. An electric-discharge lamp lighting device, comprising:
a power inverter configured to output an AC voltage by receiving electric power from a DC power supply and including at least a switching element and a resonant circuit;
a drive circuit configured to drive the switching element;
a load connected to an output of the power inverter and connected to at least an electric-discharge lamp;
a first frequency controller configured to sweep a switching frequency of the drive circuit so that the output of the power inverter is gradually increased in order to allow the electric-discharge lamp to be started and lit;

a second frequency controller configured to detect an output power of the power inverter by a current flowing in the resonant circuit and to control the switching frequency of the drive circuit so that the output power is set to be a target value after the discharge lamp is started and lit; and a lighting detector configured to perform a lighting detection of the electric-discharge lamp by detecting the output of the power inverter, wherein the first frequency controller includes a holding circuit configured to hold the switching frequency just after the lighting detection, when the output power is smaller than the target value at the lighting detection by the lighting detector, and the second frequency controller controls the switching frequency to maintain the output power at a substantially constant value, as the target value, after the output power reaches the target value.

2. The electric-discharge lamp lighting device of claim 1, wherein the holding circuit holds the switching frequency just after the lighting detection by a digital storage element.

3. The electric-discharge lamp lighting device of claim 1, wherein the lighting detector performs the lighting detection of the electric-discharge lamp by detecting a reduction of the output of the power inverter.

4. The electric-discharge lamp lighting device of claim 1, wherein the first frequency controller detects the output of the power inverter and sweeps the switching frequency so as to be a target output by a feedback control.

5. The electric-discharge lamp lighting device of claim 4, wherein the first frequency controller includes a differential amplifier configured to perform differential amplification of a detection value of the output of the power inverter and a target value for the target output, in order to perform the feedback control, and the first frequency controller controls the switching frequency of the drive circuit according to an output of the differential amplifier, and the holding circuit holds the output of the differential amplifier so that the switching frequency at the lighting detection is held.

6. The electric-discharge lamp lighting device of claim 5, wherein the holding circuit holds the output of the differential amplifier by varying the target value.

7. The electric-discharge lamp lighting device of claim 5, wherein the holding circuit holds the output of the differential amplifier by varying the detection value.

8. The electric-discharge lamp lighting device of claim 4, wherein the first frequency controller includes a differential amplifier configured to perform differential amplification of a detection value of the output of the power inverter and a target value for the target output, in order to perform the feedback control, and the first frequency controller controls the switching frequency of the drive circuit according to an output of the differential amplifier and an output of the lighting detector, and the holding circuit varies the output of the lighting detector so that the switching frequency at the lighting detection is held.

9. The electric-discharge lamp lighting device of claim 1, wherein the electric-discharge lamp includes at least one of buffer gases including Kr.

10. The electric-discharge lamp lighting device of claim 1, wherein the load includes an induction coil connected to the output of the power inverter and an electrodeless discharge lamp including a bulb to light provided adjacent to the induction coil and filled with discharge gas.

11. A lighting fixture, comprising:
the electric-discharge lamp lighting device of claim 1.

* * * * *